United States Patent
Yoshida

(10) Patent No.: US 10,852,591 B2
(45) Date of Patent: *Dec. 1, 2020

(54) IMAGE DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,063

(22) Filed: Jun. 25, 2019

(65) Prior Publication Data

US 2020/0004066 A1    Jan. 2, 2020

Related U.S. Application Data

(60) Provisional application No. 62/691,663, filed on Jun. 29, 2018.

(51) Int. Cl.
*G09G 3/36*    (2006.01)
*G02F 1/1343*    (2006.01)
(Continued)

(52) U.S. Cl.
CPC ........ *G02F 1/1343* (2013.01); *G02F 1/13306* (2013.01); *G02F 1/136286* (2013.01); *G06F 1/10* (2013.01); *G09G 3/3648* (2013.01)

(58) Field of Classification Search
CPC ...... G06F 1/10; G02F 1/13306; G02F 1/1343; G02F 1/136286; G09G 3/3648;
(Continued)

(56) References Cited

U.S. PATENT DOCUMENTS 5,835,169 A    11/1998    Kwon et al.
6,330,044 B1    12/2001    Murade
(Continued)

FOREIGN PATENT DOCUMENTS

JP    05-341323 A    12/1993
JP    09-218424 A    8/1997
JP    10-301100 A    11/1998

OTHER PUBLICATIONS

Yoshida, M. et al.; "Image Display Device"; U.S. Appl. No. 16/451,184, filed Jun. 25, 2019.

*Primary Examiner* — Towfiq Elahi
(74) *Attorney, Agent, or Firm* — Keating & Bennett, LLP

(57) ABSTRACT

The image display device of the present invention includes a substrate. The substrate includes: an insulating substrate; a first metal layer, a first insulating layer, a second metal layer, a second insulating layer, and a third metal layer stacked in the stated order on the insulating substrate; a pixel control transistor; a first line; a gate driver provided with unit circuits; and a first connection line electrically connecting the first line and each unit circuit to each other. A gate electrode of the pixel control transistor is provided in the first metal layer. A drain electrode and a source electrode of the pixel control transistor are provided in the second metal layer. The first line is provided in the third metal layer. The first connection line is extended from the first line to each unit circuit through a region sandwiched by the first line and the gate driver.

13 Claims, 16 Drawing Sheets

(51) Int. Cl.
*G06F 1/10*       (2006.01)
*G02F 1/133*      (2006.01)
*G02F 1/1362*     (2006.01)

(58) Field of Classification Search
CPC ......... G09G 3/3677; G09G 2300/0408; G09G 2310/0286
See application file for complete search history.

(56) References Cited

U.S. PATENT DOCUMENTS

| | | |
|---|---|---|
| 2001/0019384 A1 | 9/2001 | Murade |
| 2001/0030722 A1 | 10/2001 | Murade |
| 2007/0080917 A1* | 4/2007 | Koyama ............. H01L 27/3276 345/92 |
| 2008/0296581 A1* | 12/2008 | Chao ................. G02F 1/136213 257/71 |
| 2009/0101908 A1* | 4/2009 | Kwack .............. G02F 1/136286 257/59 |
| 2011/0228189 A1* | 9/2011 | Oh ...................... G02F 1/13338 349/43 |
| 2015/0070616 A1* | 3/2015 | Ogasawara ........... G02F 1/1339 349/43 |
| 2016/0180817 A1* | 6/2016 | Cho ........................ G09G 3/20 345/213 |
| 2018/0364509 A1* | 12/2018 | Yamaguchi ......... G02F 1/13439 |

\* cited by examiner

US 10,852,591 B2

IMAGE DISPLAY DEVICE

CROSS-REFERENCE TO RELATED APPLICATIONS

The present application claims priority under 35 U.S.C. § 119 to U.S. Application No. 62/691,663 filed on Jun. 29, 2018, the contents of which are incorporated herein by reference in their entirety.

BACKGROUND OF THE INVENTION

Field of the Invention

The present invention relates to an image display device. More particularly, the present invention relates to an image display device including a gate driver monolithically provided on an insulating substrate.

Description of Related Art

As one of the image display devices, an active matrix liquid crystal display device (liquid crystal device) which includes a display region including multiple video signal lines (data lines) and multiple scanning signal lines (gate lines) is known. As an active matrix liquid crystal display device, for example, JP H05-341323 A discloses a liquid crystal display device which is provided with a pixel electrode, a thin-film transistor connected to the pixel electrode, a gate line connected to a gate electrode of the thin-film transistor, and a signal line connected to a source electrode of the thin-film transistor, in which an opaque conductive film is included between a line layer on the pixel electrode side of a gate line layer or a signal line layer and the pixel electrode via an insulating film, the conductive film extends to a region other than the pixel electrode or a part of the pixel electrode, and a certain potential is applied to the conductive film. JP H09-218424 A discloses a liquid crystal display element in which a storage electrode is formed of a conductive material that shields light, and the storage electrode can completely shield between a data line and a pixel electrode and between a gate line and a pixel electrode.

Generally, an active matrix liquid crystal display device displays an image by selecting pixels arranged in a matrix in units of row and writing a voltage corresponding to display data to the selected pixels. Conventionally, in such a liquid crystal display device, a gate driver (scanning signal line drive circuit) for driving a scanning signal line is often mounted as an integrated circuit (IC) chip in a peripheral portion of a substrate constituting a liquid crystal display panel to select pixels in units of row. A shift register is provided in the gate driver for sequentially shifting an output signal (scanning signal) based on a clock signal. However, in recent years, in order to achieve reduction in size and cost of the liquid crystal display device, a gate driver may be provided monolithically on a thin-film transistor (TFT) substrate (also referred to as an array substrate or a liquid crystal device substrate), which is one of two glass substrates constituting a liquid crystal display panel.

As an image display device including a (monolithicated) gate driver provided monolithically on an array substrate, for example, JP H10-301100 A discloses a liquid crystal device in which in a liquid crystal device substrate of a liquid crystal device, a conductive first light shielding film is provided at least in a lower part of a channel region of a pixel switching TFT, and the first light shielding film is extended along a scanning line and connected to a constant potential line for supplying a constant potential outside a pixel region to fix a potential of the first light shielding film.

BRIEF SUMMARY OF THE INVENTION

The gate driver provided monolithically on the array substrate is also referred to as a gate driver monolithic (GDM) circuit. In an image display device provided with the GDM circuit, reducing a region (frame region) in which the GDM circuit is arranged is difficult, particularly in the case of a high definition model. The reason will be described below by taking the liquid crystal display device of Comparative Embodiment 1 as an example.

FIG. 18 is a schematic plan view showing a periphery of a unit circuit included in a gate driver of a liquid crystal display device of Comparative Embodiment 1. A liquid crystal display device 1R of Comparative Embodiment 1 includes a GDM circuit. On an array substrate included in a liquid crystal display device 1R of Comparative Embodiment 1, multiple scanning signal lines GLR are arranged in a display region AR at an interval of approximately 60 μm. Further, in a frame region NR which is a region outside the display region AR, a shift register 400R in which multiple unit circuits 10BR each including an output control TFT 10DR and a bootstrap capacitor CapR are connected in multiple stages and lines for inputting drive signals to the shift register 400R are arranged. In the liquid crystal display device 1R, as main lines for inputting drive signals to the shift register 400R, one initialization line L1R, four clock signal lines L2R, one low potential line (constant potential line) L3R, and two start signal lines L4R are arranged. Multiple branch lines L31R are branched from the low potential line L3R, and the branch lines L31R are electrically connected to the corresponding unit circuits 10BR, respectively. Further, a common main line L5R is arranged between the display region AR and the shift register 400. The common main line L5R is electrically connected to an auxiliary capacitor line L51R provided in the display region AR.

The GDM circuit included in the liquid crystal display device 1R is supplied with a low potential of a constant potential from the low potential line L3R. The low potential is commonly used in many (preferably all) shift register stages (unit circuits 10BR), for example, as a low level signal (potential for turning off the pixel control TFT) supplied to the scanning signal line GLR, and a reference potential of the gate electrode of the output control TFT 10DR for outputting a signal to the scanning signal line GLR. Therefore, since a load needs to be reduced, the line width tends to be large.

Here, a region occupied in the Y direction (vertical direction in the drawing) of each unit circuit 10BR of GDM is limited corresponding to a Y pitch (pitch in the vertical direction) of the pixels. Therefore, especially in high-definition models, a region in the X direction (left and right direction in the drawing) tends to be wide, and in order to reduce the frame region NR, thinning and omission of the line for supplying signals to the GDM circuit is expected.

JP H05-341323 A and JP H09-218424 A do not disclose the GDM circuit, and no consideration is made of the reduction of the frame region.

The liquid crystal device disclosed in FIG. 19 of JP H10-301100 A includes a first light shielding film forming an auxiliary capacitor, and the first light shielding film is connected to the constant potential line that supplies a constant potential power supply on the low potential side of a scanning line drive circuit. The first light shielding film has a branch line extending along each scanning line and a main line connected to each branch line at an end of each branch line and extending in a direction orthogonal to each scanning line, and is connected to the constant potential line via the main line. Therefore, since a constant potential line is required in the scanning line drive circuit, there is still room for improvement in terms of reducing the frame region.

The present invention has been made in view of such a current state of the art and aims to provide an image display device capable of reducing a frame region.

The inventor of the present invention conducted various studies on an image display device capable of reducing the frame region, and focused on the provision of a new metal layer in addition to the source metal layer and the gate metal layer. Then, in an image display device in which a gate driver including multiple unit circuits connected in multiple stages is monolithically provided on an insulating substrate in a frame region, a first line is arranged in a display region in the new metal layer, a first connection line that electrically connects the first line and each of the unit circuits to each other is arranged, and the first connection line is extended from the first line to each unit circuit through a region sandwiched by the first line and the gate driver. Thereby, a signal applied commonly to each unit circuit can be directly input from the display region to each unit circuit through the region sandwiched by the first line and the gate driver. Therefore, the main line (for example, a low potential line and an initialization line) to which such a signal is applied can be thinned or omitted in the gate driver. Thereby, the inventor has arrived at the solution to the above problem, completing the present invention.

(1) An embodiment of the present invention is an image display device including: a substrate; a display region for displaying an image; and a frame region which is a region outside the display region, wherein the substrate includes: an insulating substrate; a first metal layer, a first insulating layer, a second metal layer, a second insulating layer, and a third metal layer stacked in the stated order on the insulating substrate; a pixel electrode provided in the display region; a pixel control transistor provided in the display region and electrically connected to the pixel electrode; a first line provided in the display region; a gate driver provided with multiple unit circuits connected in multiple stages and provided monolithically on the insulating substrate in the frame region; and a first connection line electrically connecting the first line and each of the unit circuits to each other, a gate electrode of the pixel control transistor is provided in the first metal layer, a drain electrode and a source electrode of the pixel control transistor are provided in the second metal layer, the first line is provided in the third metal layer, and the first connection line is extended from the first line to each of the unit circuits through a region sandwiched by the first line and the gate driver.

(2) In an embodiment of the present invention, the image display device includes the structure (1), the first connection line is provided in the third metal layer, and the first line and the first connection line are integrally provided in the third metal layer.

(3) In an embodiment of the present invention, the image display device includes the structure (1) or (2), the substrate further includes a scanning signal line electrically connected to the gate electrode of the pixel control transistor, and each of the unit circuits includes:

a clock terminal to which a clock signal is input; an output terminal electrically connected to the scanning signal line and configured to output a scanning signal to the scanning signal line; and an output control transistor with one of a source electrode and a drain electrode connected to the clock terminal and the other of the source electrode and the drain electrode connected to the output terminal.

(4) In an embodiment of the present invention, the image display device includes the structure (3), each of the unit circuits further includes a bootstrap capacitor having a first terminal connected to a gate electrode of the output control transistor and a second terminal connected to the output terminal, at least one of the bootstrap capacitors is a bootstrap capacitor provided with a slit, and the first connection line does not overlap the slit.

(5) In an embodiment of the present invention, the image display device includes the structure (3) or (4), the gate driver further includes a clock signal line electrically connected to each of the clock terminals, each of the clock terminals receives a clock signal via the clock signal line, and the first connection line does not overlap the clock signal line.

(6) In an embodiment of the present invention, the image display device includes the structure (1), (2), (3), (4) or (5), the substrate further includes a second line provided in the display region, and a second connection line electrically connecting a unit circuit of a first stage among the unit circuits and the second line to each other, the second line is provided in the third metal layer, the second connection line is provided extending from the second line to the unit circuit of the first stage without passing through a region sandwiched by the second line and the gate driver, the unit circuit of the first stage includes an input terminal to which a start signal is input, the second line is electrically connected to the input terminal via the second connection line, and a start signal is input to the input terminal via the second line and the second connection line.

(7) In an embodiment of the present invention, the image display device includes the structure (6) and the second line does not overlap the pixel control transistor.

(8) In an embodiment of the present invention, the image display device includes the structure (1), (2), (3), (4), (5), (6) or (7), the substrate further includes a third line provided in the display region, and a third connection line electrically connecting the third line and each of the unit circuits to each other, the third line is provided in the third metal layer, and the third connection line is provided extending from the third line to each of the unit circuits without passing through a region sandwiched by the third line and the gate driver.

(9) In an embodiment of the present invention, the image display device includes the structure (8), each of the unit circuits includes a clear terminal to which an initialization signal is input, the third line is electrically connected to each of the clear terminals via the third connection line, and the initialization signal is input to each of the clear terminals via the third line and the third connection line.

(10) In an embodiment of the present invention, the image display device includes the structure (1), (2), (3), (4), (5), (6), (7), (8) or (9), each of the unit circuits includes a power supply terminal to which a low potential is input, the first line is electrically connected to each of the power supply terminals via the first connection line, and a low potential is input to each of the power supply terminals via the first line and the first connection line.

(11) In an embodiment of the present invention, the image display device includes the structure (1), (2), (3), (4), (5), (6), (7) or (8), each of the unit circuits has a clear terminal to which an initialization signal is input, the first line is electrically connected to each of the clear terminals via the first connection line, and the initialization signal is input to each of the clear terminals via the first line and the first connection line.

(12) In an embodiment of the present invention, the image display device includes the structure (1), (2), (3), (4), (5), (6), (7), (8), (9), (10) or (11) and further includes: a counter substrate facing the substrate and including a common electrode; and a common transition portion electrically connecting the substrate and the counter substrate to each other, in which the substrate further includes a fourth line provided in the display region, the fourth line is provided in the third metal layer and is electrically connected to the common electrode via the common transition portion, and a common signal is input to the common electrode via the fourth line and the common transition portion.

(13) In an embodiment of the present invention, the image display device includes the structure (1), (2), (3), (4), (5), (6), (7), (8), (9), (10), (11) or (12) and is the image display device which is a liquid crystal display device.

The present invention can provide an image display device capable of reducing a frame region.

DETAILED DESCRIPTION OF THE INVENTION

Hereinafter, embodiments are shown, and the present invention will be described in more detail with reference to the drawings, but the present invention is not limited only to these embodiments. Further, the configurations of the embodiments may be appropriately combined or changed within the spirit of the present invention.

Embodiment 1

In the present embodiment, an image display device will be described by taking a liquid crystal display device as an example. More specifically, a liquid crystal display device of TN (Twisted Nematic) mode in which liquid crystal molecules having positive anisotropy of dielectric constant are aligned in the state of being twisted by 90° when viewed from the substrate normal direction will be described as an example.

Figure 1:
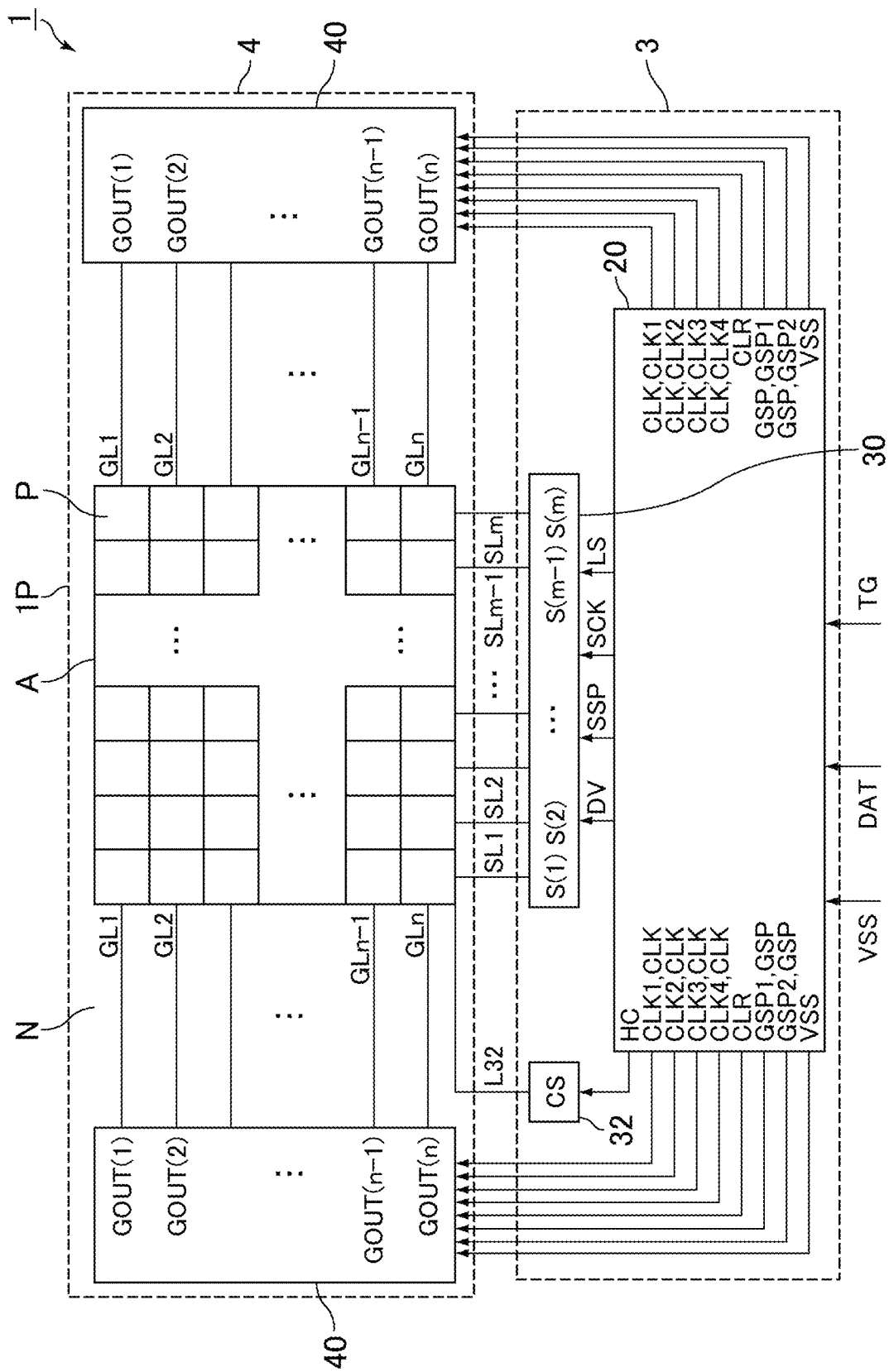
FIG. 1 is a block diagram showing an entire configuration of a liquid crystal display device of Embodiment 1.

FIG. 1 is a block diagram showing the entire configuration of the liquid crystal display device of Embodiment 1. A liquid crystal display device 1 of the present embodiment includes a liquid crystal display panel 1P as a display panel. The liquid crystal display panel 1P has a display region A in which an image is displayed and a frame region N which is a region outside the display region A.

The liquid crystal display panel 1P includes an array substrate 4 as a substrate. An IC chip 3 having a display control circuit 20, a source driver (video signal line drive circuit) 30, and a common driver (common electrode drive circuit) 32 is mounted in the frame region N of the array substrate 4 of the liquid crystal display panel 1P. Further, in the frame region N of the liquid crystal display panel 1P, a gate driver (scanning signal line drive circuit) 40 is directly formed on the array substrate 4. The gate driver 40 in the present embodiment is a monolithic gate driver.

One source driver 30 is arranged downward in the drawing of the display region A, and a total of two gate drivers 40 are arranged in the lateral direction in the drawing of the display region A (one in the left and one in the right of the drawing).

In the display region A, multiple (m, m is an integer of 2 or more) video signal lines SL (SL1 to SLm), multiple (n, n is an integer of 2 or more) scanning signal lines GL (GL1 to GLn), and multiple (n×m) display units P provided in a matrix respectively corresponding to the intersections of the video signal lines SL1 to SLm and the scanning signal lines GL1 to GLn are arranged. In the present specification, each of the video signal lines SL1 to SLm is also referred to as a video signal line SL. In addition, each of the scanning signal lines GL1 to GLn is also referred to as a scanning signal line GL. Further, "display unit" means a region corresponding to one pixel electrode, and may be one called "pixel" in the technical field of the liquid crystal display device, and in the case of dividing and driving one pixel, the divided pixels may be called "sub-pixels", "dots" or "picture elements".

The display control circuit 20 externally receives an image signal DAT and a timing signal group TG such as a horizontal synchronization signal and a vertical synchronization signal, and the display control circuit 20 outputs, based on these signals, a digital video signal DV, and a source start pulse signal SSP, a source clock signal SCK, and a latch strobe signal LS for controlling image display in the display region A to the source driver 30. The display control circuit 20 also outputs a first gate start pulse signal GSP1 and a second gate start pulse signal GSP2 as start signals to the gate driver 40 based on the image signal DAT and the timing signal group TG. Further, the display control circuit 20, based on the image signal DAT and the timing signal group TG, outputs a first gate clock signal CLK1, a second gate clock signal CLK2, a third gate clock signal CLK3, a fourth gate clock signal CLK4, and an initialization signal CLR to the gate driver 40, and outputs a common driver control signal HC for controlling an operation of a common driver 32 to the common driver 32. The common driver 32 outputs a common electrode drive signal CS based on the common driver control signal HC output from the display control circuit 20. The common electrode drive signal CS is applied to a common electrode provided so as to cover the display region A on the counter substrate (color filter substrate) arranged opposite to the array substrate 4 via the common main line L32. In the present specification, each of the first to fourth gate clock signals CLK1 to CLK4 is also referred to as a "gate clock signal CLK", and the gate clock signal is also referred to as a "clock signal". The first and second gate start pulse signals GSP1 and GSP2 are also referred to as gate start pulse signals GSP, respectively.

Figure 2:
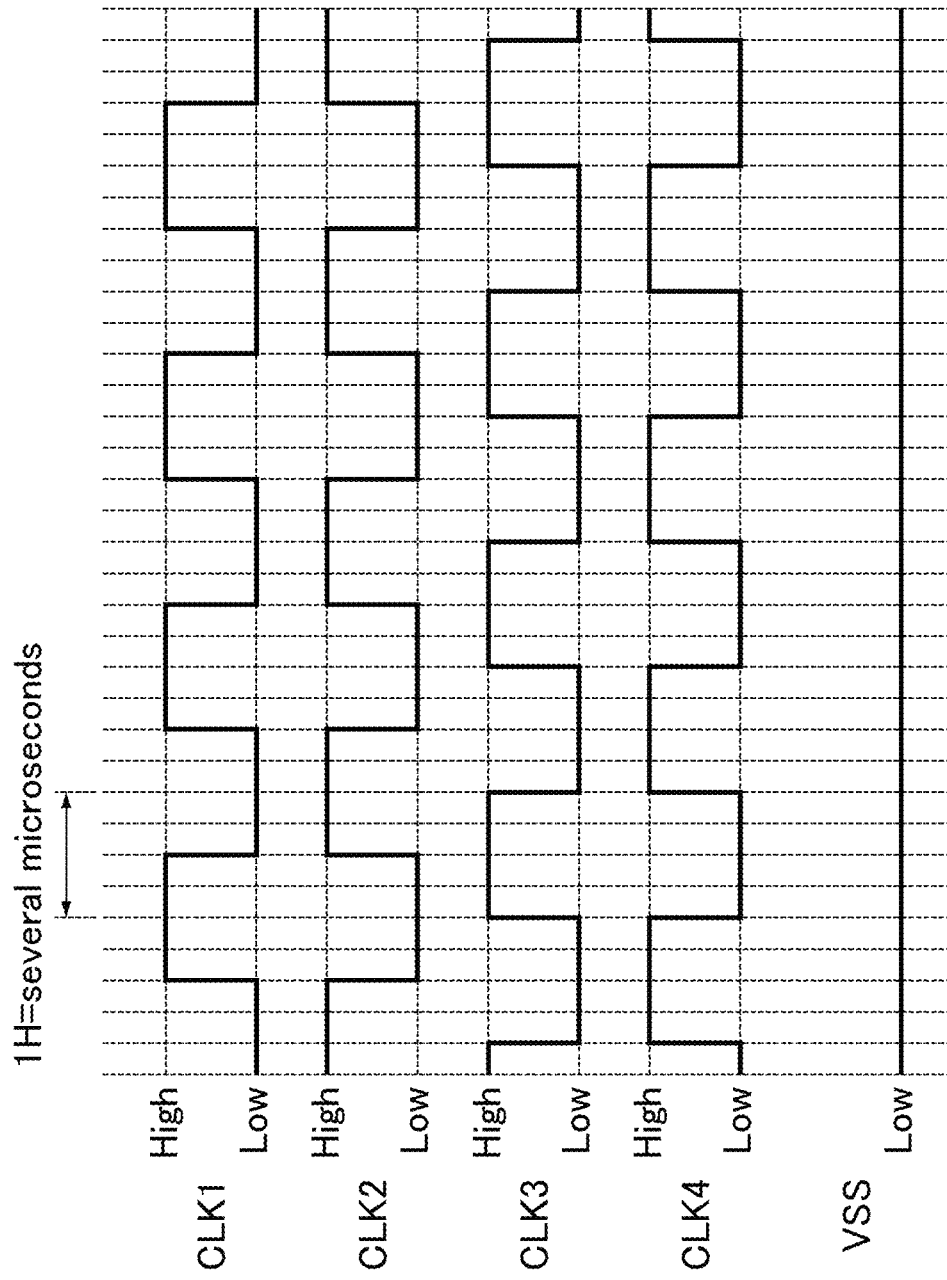
FIG. 2 is a timing chart for describing a gate clock signal.

FIG. 2 is a timing chart for describing the gate clock signal. The gate clock signal CLK is a signal in which a high potential state and a low potential state are periodically repeated. As shown in FIG. 2, each of the first to fourth gate clock signals CLK1 to CLK4 has the same length of one cycle, and is a signal in which a potential is inverted between a low potential (Low=the same potential as the power supply voltage VSS) and a high potential (High) every half cycle. The first and second gate clock signals CLK1 and CLK2 are signals that are out of phase by quarter cycle with the third and fourth gate clock signals CLK3 and CLK4, respectively. The cycle of the first to fourth gate clock signals CLK1 to CLK4 is, for example, several μ seconds to several tens of μ seconds.

The first and second gate clock signals CLK1 and CLK2 are paired signals, and the third and fourth gate clock signals CLK3 and CLK4 are paired signals. As described later, the first and second gate clock signals CLK1 and CLK2 are supplied to the unit circuits 10B(1), 10B(3), 10B(5) . . . of the odd-numbered stages, and the third and fourth gate clock signals CLK3 and CLK4 are not supplied. Further, the third and fourth gate clock signals CLK3 and CLK4 are supplied to the unit circuits 10B(2), 10B(4), 10B(6) . . . of the even-numbered stages, and the first and second gate clock signals CLK1 and CLK2 are not supplied.

As shown in FIG. 1, the source driver 30 receives the digital video signal DV, the source start pulse signal SSP, the source clock signal SCK, and the latch strobe signal LS from the display control circuit 20, and the source driver 30 applies, based on these signals, drive video signals S(1) to S(m) to the respective video signal lines SL1 to SLm. In the present specification, the drive video signals S(1) to S(m) are also referred to as drive video signals S, respectively.

Figure 3:
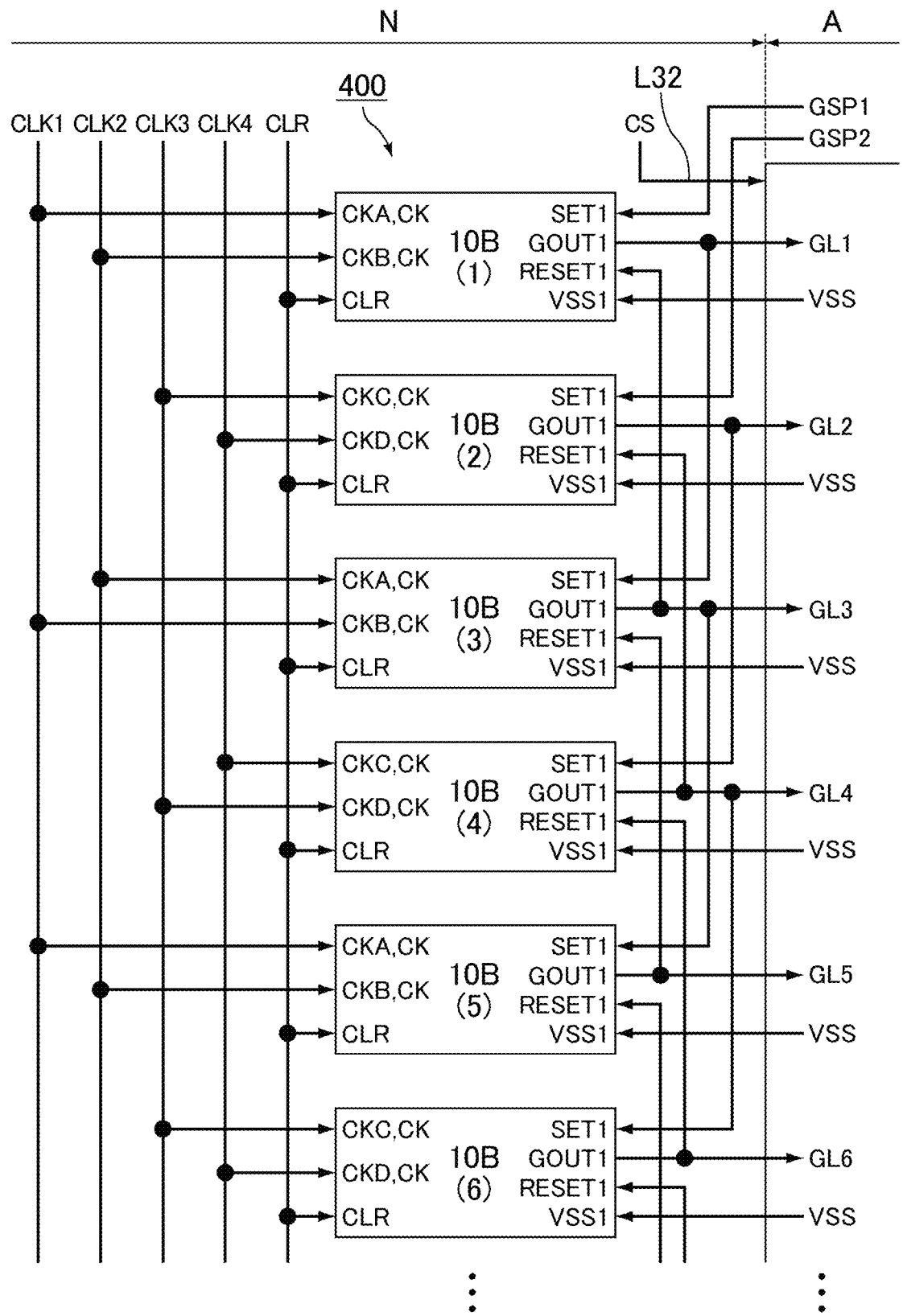
FIG. 3 is a detail of a block diagram showing a configuration of a gate driver.

Next, the configuration of the gate driver 40 in the present embodiment will be described. FIG. 3 is a detail of a block diagram showing the configuration of the gate driver. As shown in FIGS. 1 and 3, the gate driver 40 is constituted by n stages of shift registers 400. In the display region A, a pixel matrix (display unit P) of n rows×m columns is formed, and each stage of the shift register 400 is arranged to correspond to each row of the pixel matrix one to one. Further, each stage of the shift register 400 is a unit circuit (bistable circuit) that becomes one of two states (a first state and a second state) at each time point and outputs a signal (state signal) indicating the state as a scanning signal. Thus, the shift register 400 is constituted by n unit circuits 10B(1) to 10B(n). In the present embodiment, when a unit circuit is in the first state, a high level (on level) potential state signal is output from the unit circuit, and when the unit circuit is in the second state, a low level (off level) potential state signal is output from the unit circuit. In the present specification, each of the unit circuits 10B(1) to 10B(n) is also referred to as 10B.

Among the unit circuits 10B, clock terminals CKA and CKB for receiving two-phase clock signals (the first gate clock signal CLK1 and the second gate clock signal CLK2) are provided in the unit circuits 10B of the odd-numbered stages, and clock terminals CKC and CKD for receiving two-phase clock signals (the third gate clock signal CLK3 and the fourth gate clock signal CLK4) are provided in the unit circuits 10B of the even-numbered stages. The clock terminals CKA, CKB, CKC, and CKD are also referred to as clock terminals CK.

In the unit circuits (10B(1), 10B(3), 10B(5), and so forth) of the odd-numbered stages, the gate clock signals (the first gate clock signal CLK1 and the second gate clock signal CLK2) input to the clock terminals CKA and CKB are switched between odd-numbered unit circuits (10B(1), 10B(5), and so forth) and even-numbered unit circuits (10B(3) and so forth). Specifically, the first gate clock signal CLK1 is input to the clock terminal CKA of the odd-numbered unit circuit among the unit circuits of the odd-numbered stages, and the second gate clock signal CLK2 is input to the clock terminal CKB. The second gate clock signal CLK2 is input to the clock terminal CKA of the even-numbered unit circuit among the unit circuits of the even-numbered stages, and the first gate clock signal CLK1 is input to the clock terminal CKB.

Each unit circuit 10B is provided with a power supply terminal VSS1 for receiving a low-level (low-potential) power supply voltage VSS, a clear terminal CLR1 for receiving an initialization signal CLR, an input terminal SET1 for receiving a set signal, an input terminal RESET1 for receiving a reset signal, and an output terminal GOUT1 for outputting a scanning signal.

When a first gate start pulse signal GSP1 (also referred to as a start signal) as a set signal, a first gate clock signal CLK1, a second gate clock signal CLK2, an initialization signal CLR, and a power supply voltage VSS supplied from a predetermined power supply circuit (not shown) are input to the unit circuit 10B(1) of the first stage of the shift register 400, an active scanning signal GOUT(1) is output from the unit circuit 10B(1) to the scanning signal line GL1 based on these signals and the voltage. The scanning signal GOUT(1) output from the unit circuit 10B(1) is applied to the corresponding scanning signal line GL1, and applied as a set signal to the unit circuit 10B(3) of a stage two stages after, that is, the third stage. When the set signal, the first gate clock signal CLK1, the second gate clock signal CLK2, the initialization signal CLR, and the power supply voltage VSS are input to the unit circuit 10B(3) of the third stage, an active scanning signal GOUT(3) is output from the unit circuit 10B(3) to the scanning signal line GL3 based on these signals and the voltage. The scanning signal GOUT(3) output from the unit circuit 10B(3) is applied to the corresponding scanning signal line GL3, and applied, as a set signal, to the unit circuit 10B(5) of a stage two stages after, that is, the fifth stage, and also applied, as a reset signal, to the unit circuit 10B(1) of a stage two stages before, that is, the first stage. The scanning signal GOUT is output from the unit circuit 10B of the odd-numbered stage after the fifth stage to the corresponding scanning signal line GL, in the same manner as in the unit circuit 10B(3) of the third stage. In this manner, the active scanning signals GOUT (1), GOUT (3), GOUT (5), and so forth are sequentially output from the corresponding unit circuits 10B(1), 10B(3), 10B (5), and so forth of the odd-numbered stages to the scanning signal lines GL1, GL3, GL5, and so forth of the odd-numbered stages.

In addition, when the second gate start pulse signal GSP2 (also referred to as a start signal) as a set signal, the third gate clock signal CLK3, the fourth gate clock signal CLK4, the initialization signal CLR, and the power supply voltage VSS are input to the unit circuit 10B(2) of the second stage of the shift register 400, an active scanning signal GOUT(2) is output from the unit circuit 10B(2) to the scanning signal line GL2 based on these signals and the voltage. The scanning signal GOUT(2) output from the unit circuit 10B (2) is applied to the corresponding scanning signal line GL2, and also applied, as a set signal, to the unit circuit 10B(4) of a stage two stages after, that is, the fourth stage. When the set signal, the third gate clock signal CLK3, the fourth gate clock signal CLK4, the initialization signal CLR, and the power supply voltage VSS are input to the unit circuit 10B(4) of the fourth stage, an active scanning signal GOUT (4) is output from the unit circuit 10B(4) to the scanning signal line GL4 based on these signals and the voltage. The scanning signal GOUT(4) output from the unit circuit 10B (4) is applied to the corresponding scanning signal line GL4, and also applied, as a set signal, to the unit circuit 10B(6) of a stage two stages after, that is, the sixth stage, and also applied, as a reset signal, to the unit circuit 10B(2) of a stage two stages before, that is, the second stage. The scanning signal GOUT is output from the unit circuit 10B of the even-numbered stage after the sixth stage to the corresponding scanning signal line GL, in the same manner as in the unit circuit 10B(3) of the fourth stage. In this manner, the active scanning signals GOUT(2), GOUT(4), GOUT(6), and so forth are sequentially output from the corresponding unit circuits 10B(2), 10B(4), 10B(6), and so forth of the even-numbered stages to the scanning signal lines GL2, GL4, GL6, and so forth of the even-numbered stages.

Thus, it can be said that the gate driver 40 of the present embodiment is two shift registers combined so that the cycles are shifted. The gate driver 40 repeats the application of the scanning signals GOUT(1) to GOUT(n) with one vertical scanning period as one cycle. In the present specification, the scanning signals GOUT(1) to GOUT(n) are also referred to as scanning signals GOUT, respectively.

Here, the signals input to the two gate drivers 40 are the same. Further, the scanning signals GOUT are simultaneously input to the respective scanning signal lines GL from the two gate drivers 40 located at both ends of the scanning signal line GL. Note that the potential of the power supply voltage VSS corresponds to the potential of the scanning signal when the scanning signal line GL is in a non-selected state. Further, the initialization signal CLR and the power supply voltage VSS are the signals commonly used in the unit circuits (10B(1), 10B(3), 10B(5), and so forth) of the odd-numbered stages and the unit circuits (10B(2), 10B(4), 10B(6), and so forth) of the even-numbered stages.

As described above, the drive video signals S(1) to S(m) corresponding to the respective video signal lines SL1 to SLm are applied, and the scanning signals GOUT(1) to GOUT(n) corresponding to the respective scanning signal lines GL1 to GLn are applied.

Figure 4:
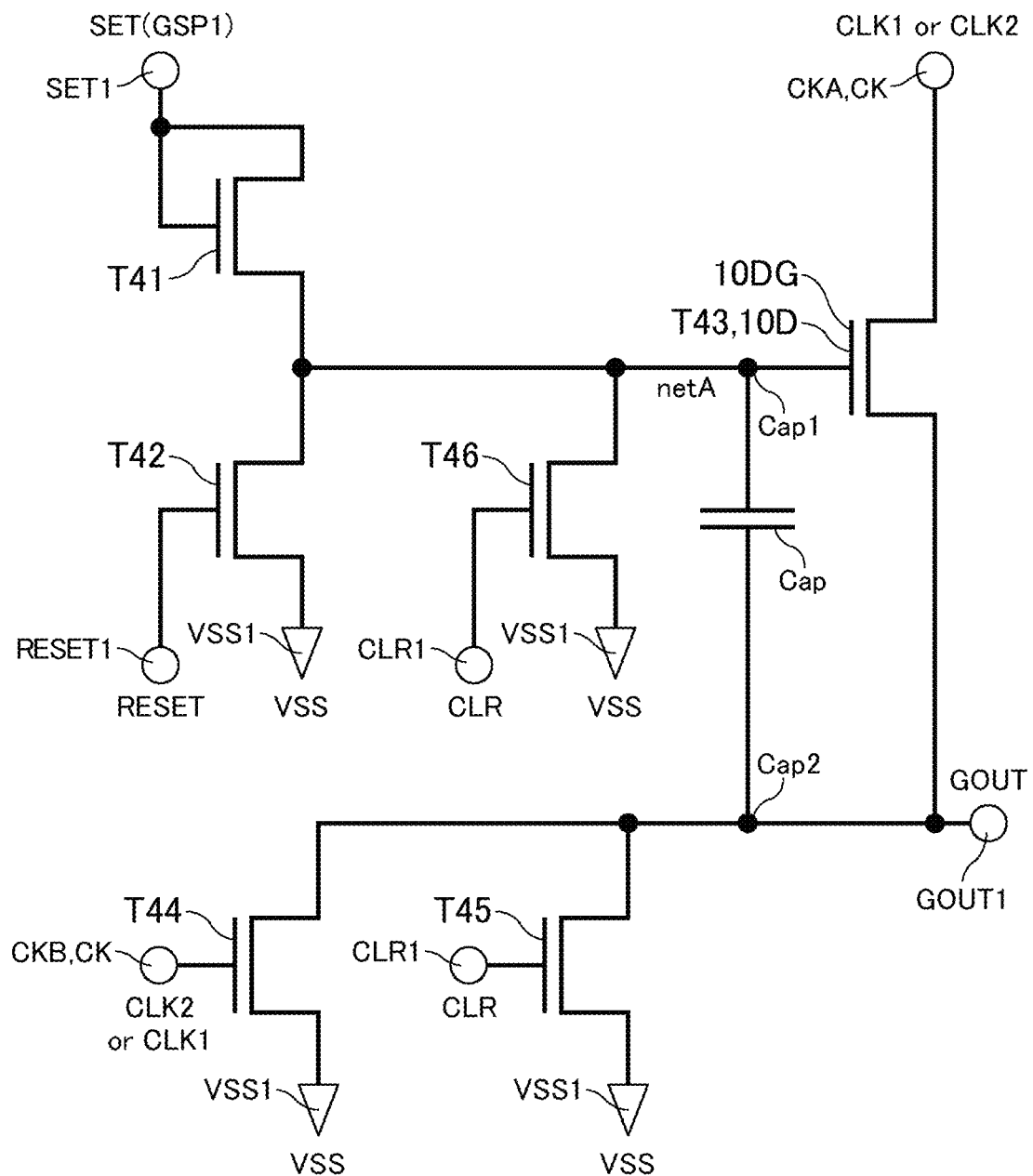
FIG. 4 is a circuit diagram showing a configuration of a unit circuit of an odd-numbered stage.

Next, the configuration of unit circuit 10B will be described in detail. FIG. 4 is a circuit diagram showing a configuration of a unit circuit of the odd-numbered stage. Each unit circuit 10B of the odd-numbered stage has six TFTs (thin-film transistors T41, T42, T43, T44, T45, and T46) and a bootstrap capacitor Cap. Each unit circuit 10B has a power supply terminal VSS1 for receiving a low-level power supply voltage VSS, five input terminals (an input terminal SET1 to which a set signal SET is input, an input terminal RESET1 to which a reset signal RESET is input), a clock terminal CKA, a clock terminal CKB, and a clear terminal CLR1), and one output terminal (output node) GOUT1. The drain terminal of the thin-film transistor T41, the drain terminal of the thin-film transistor T42, and the gate terminal of the thin-film transistor T43 are connected to one another. A region in which these terminals are connected to one another is also referred to as a "netA".

The gate terminal and the source terminal of the thin-film transistor T41 are connected to the input terminal SET1. That is, the gate terminal and the source terminal are diode-connected. The drain terminal of the thin-film transistor T41 is connected to the netA.

The gate terminal of the thin-film transistor T42 is connected to the input terminal RESET1, the drain terminal is connected to the netA, and the source terminal is connected to the power supply terminal VSS1.

The gate terminal of the thin-film transistor T43 is connected to the netA, the source terminal is connected to the clock terminal CKA, and the drain terminal is connected to the output terminal GOUT1. The thin-film transistor T43 is an output control TFT 10D that functions as an output control transistor in each unit circuit 10B. The output control transistor is a transistor in which one of the conduction terminals (the drain terminal in the present embodiment) is connected to the output terminal in the unit circuit 10B, and controls the potential of the scanning signal GOUT by changing the potential of the control terminal of the transistor (the gate terminal in the present embodiment).

The gate terminal of the thin-film transistor T44 is connected to the clock terminal CKB, the drain terminal is connected to the output terminal GOUT1, and the source terminal is connected to the power supply terminal VSS1.

The gate terminal of the thin-film transistor T45 is connected to the clear terminal CLR1, the drain terminal is connected to the output terminal GOUT1, and the source terminal is connected to the power supply terminal VSS1.

The gate terminal of the thin-film transistor T46 is connected to the clear terminal CLR1, the drain terminal is connected to the netA, and the source terminal is connected to the power supply terminal VSS1. The thin-film transistor T46 can initialize the netA.

One end of the bootstrap capacitor Cap is connected to the netA, and the other end is connected to the output terminal GOUT1. The bootstrap capacitor Cap is formed between the netA and the output terminal GOUT1, that is, between the gate and the source of the thin-film transistor T43. The bootstrap capacitor Cap raises the potential of the netA together with the rise of the potential of the output terminal GOUT1. By thus providing the bootstrap capacitor Cap, in the liquid crystal display device 1 of the present embodiment, a potential higher than the power supply potential (power supply voltage) can be generated, and the output control TFT 10D (thin-film transistor T43) can be changed from the off state to the on state in a short time so as to reduce the output loss as much as possible.

Although FIG. 4 shows the configuration of the unit circuit of the odd-numbered stage, as the unit circuit of the even-numbered stage, the one in which the first gate clock signal CLK1 in FIG. 4 is changed to the third gate clock signal CLK3, the second gate clock signal CLK2 to the fourth gate clock signal CLK4, the clock terminal CKA to the clock terminal CKC, the clock terminal CKB to the clock terminal CKD, and the first gate start pulse signal GSP1 to the second gate start pulse signal GSP2 can be used.

Figure 5A:
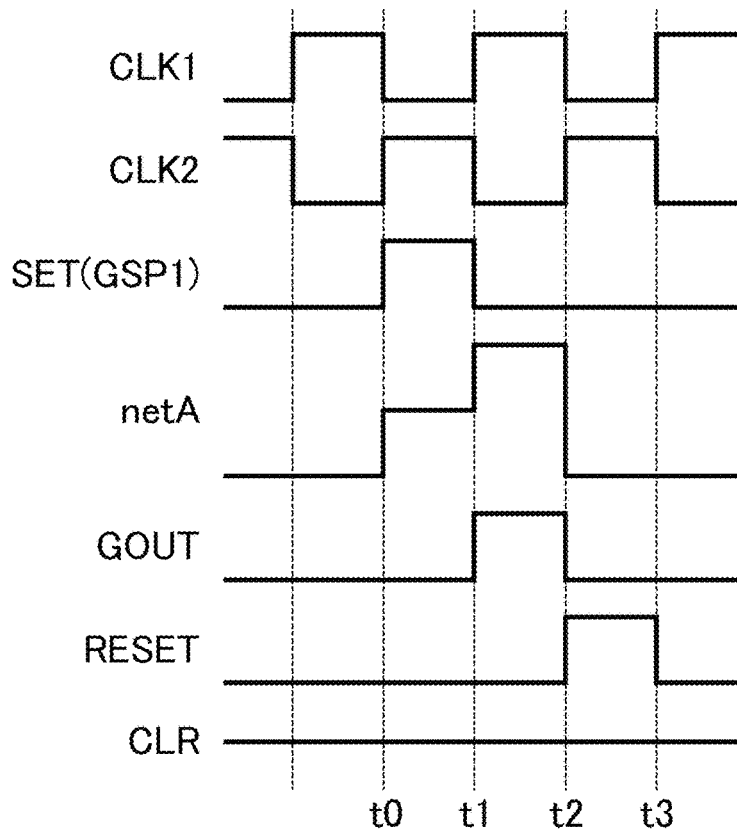
FIG. 5A is a diagram for describing an operation of a shift register, and is a timing chart regarding a unit circuit of an odd-numbered stage.
Figure 5B:
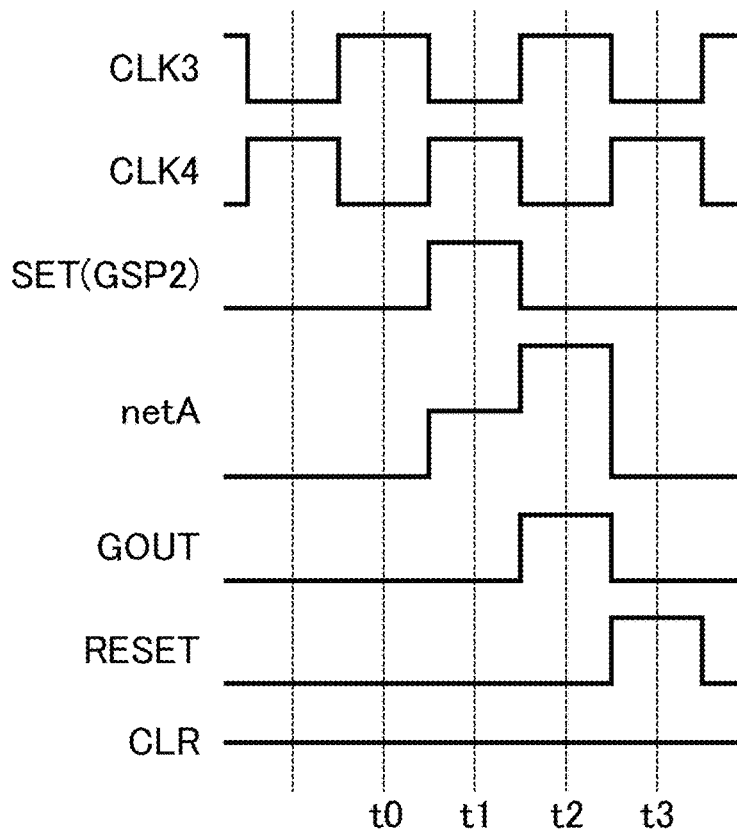
FIG. 5B is a diagram for describing an operation of a shift register, and a timing chart regarding a unit circuit of an even-numbered stage.

FIG. 5A is a diagram for describing the operation of the shift register, and is a timing chart regarding the unit circuit of the odd-numbered stage. FIG. 5B is a diagram for describing the operation of the shift register, and is a timing chart regarding the unit circuit of the even-numbered stage.

The operation of each unit circuit 10B in the odd-numbered stage will be described using FIG. 5A. To the clock terminal CKA, the first gate clock signal CLK1 which becomes high-level every one horizontal scanning period is input. To the clock terminal CKB, the second gate clock signal CLK2 that is 180 degrees out of phase with the first gate clock signal CLK1 is input. In the period before a time point t0, the potential of the netA and the potential of the scanning signal GOUT (output terminal GOUT1) are at the low level.

At the time point t0, the set signal SET (in the case of the unit circuit of the first stage, the first gate start pulse signal GSP1 as the set signal SET) is applied to the input terminal SET1. Here, the time point t0 is the timing at which the scanning signal line GL connected two stages before is in the selected state (the timing at which the first gate start pulse signal GSP1 is input when the unit circuit 10B being focused is the unit circuit 10B(1) of the first stage).

Since the thin-film transistor T41 is diode-connected, the thin-film transistor T41 is turned on by the set signal SET, and the bootstrap capacitor Cap is charged. As a result, the potential of the netA changes from the low-level to the high-level, and the thin-film transistor T43 is turned on. Here, during the period from time points t0 to t1, since the first gate clock signal CLK1 is at a low-level, the scanning signal GOUT is maintained at the low-level during this period. Further, during this period, since the reset signal RESET is at the low-level, the thin-film transistor T42 is maintained in the off-state. Therefore, the potential of the netA does not decrease during the period from the time points t0 to t1.

At the time point t1, the first gate clock signal CLK1 changes from the low-level to the high-level. At this time, since the thin-film transistor T43 is in the on-state, the potential of the output terminal GOUT1 rises together with the rise of the potential of the clock terminal CKA. Here, since the bootstrap capacitor Cap is formed between the netA and the output terminal GOUT1, the potential of the netA also rises together with the rise of the potential of the output terminal GOUT1 (the netA is bootstrapped). As a result, a large voltage is applied to the gate terminal of the thin-film transistor T43, and the potential of the scanning signal GOUT rises to the high-level potential of the first gate clock signal CLK1. Thus, the scanning signal line GL connected to the output terminal GOUT1 of the unit circuit 10B is in the selected state.

Since the second gate clock signal CLK2 and the initialization signal CLR are at the low-level during the period from time points t1 to t2, the thin-film transistors T44 and T45 are maintained in the off-state, and during the period from the time points t1 to t2, the potential of the scanning signal GOUT never falls.

At the time point t2, the first gate clock signal CLK1 changes from the high-level to the low-level, whereby the potential of the output terminal GOUT1 decreases together with the decrease of the potential of the clock terminal CKA, and the potential of the netA also decreases via the bootstrap capacitor Cap. At the time point t2, a pulse of the reset signal RESET is applied to the input terminal RESET1, and the thin-film transistor T42 is turned on. As a result, the potential of the netA changes from the high-level to the low-level. At the time point t2, the second gate clock signal CLK2 changes from the low-level to the high-level. Thus, the thin-film transistor T44 is turned on, and as a result, the potential of the output terminal GOUT1, that is, the potential of the scanning signal GOUT becomes low-level.

The scanning signal GOUT output from each unit circuit 10B of the odd-numbered stage is input to the input terminal SET1 of the unit circuit after two stages as the set signal SET, and is also input to the input terminal RESET1 of the unit circuit of a stage two stages before as the reset signal RESET. As a result, the scanning signal lines GL provided in the display region A are in the selected state by skipping one stage such as GL1, GL3, GL5, GL7, and so on.

As shown in FIG. 5B, the unit circuit 10B of the even-numbered stage is the same as the unit circuit 10B of the odd-numbered stage except that the first gate clock signal CLK1 is changed to the third gate clock signal CLK3, the second gate clock signal CLK2 is changed to the fourth gate clock signal CLK4, and the first gate start pulse signal GSP1 is changed to the second gate start pulse signal GSP2. Also in the even-numbered stages, in the same manner as in the odd-numbered stages, the scanning signal lines GL provided in the display region A are in the selected state by skipping one stage such as GL2, GL4, GL6, GL8, and so on.

As described above, each of the scanning signal lines GL1, GL3, GL5, GL7, and so forth of the odd-numbered stages and the scanning signal lines GL2, GL4, GL6, GL8, and so forth of the even-numbered stages are in the selected state by skipping one stage, and thus the scanning signal lines GL1, GL2, GL3, GL4, GL5, GL6, GL7, GL8, and so forth are sequentially selected.

Figure 6:
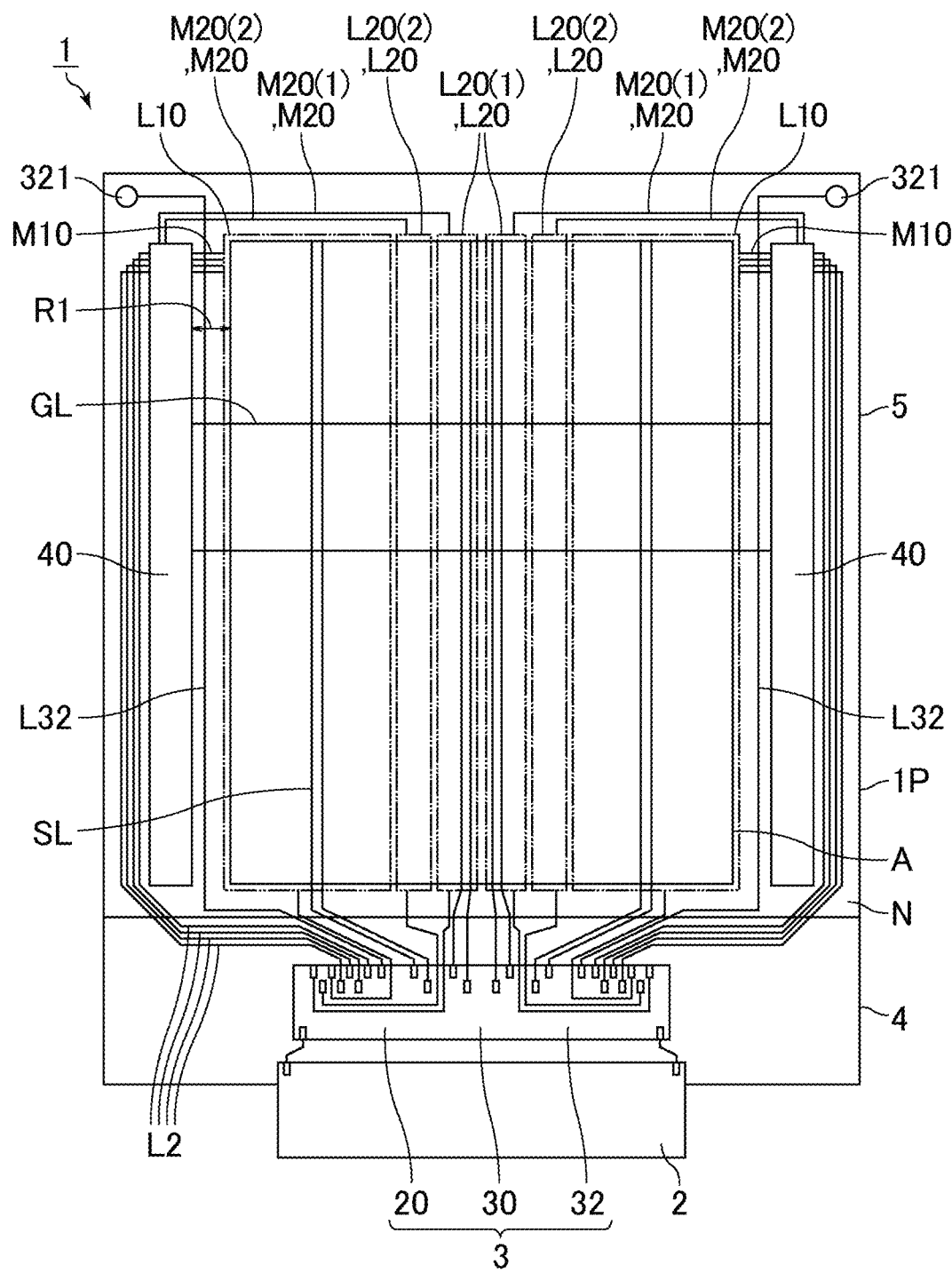
FIG. 6 is a schematic plan view of the liquid crystal display device of Embodiment 1.
Figure 7:
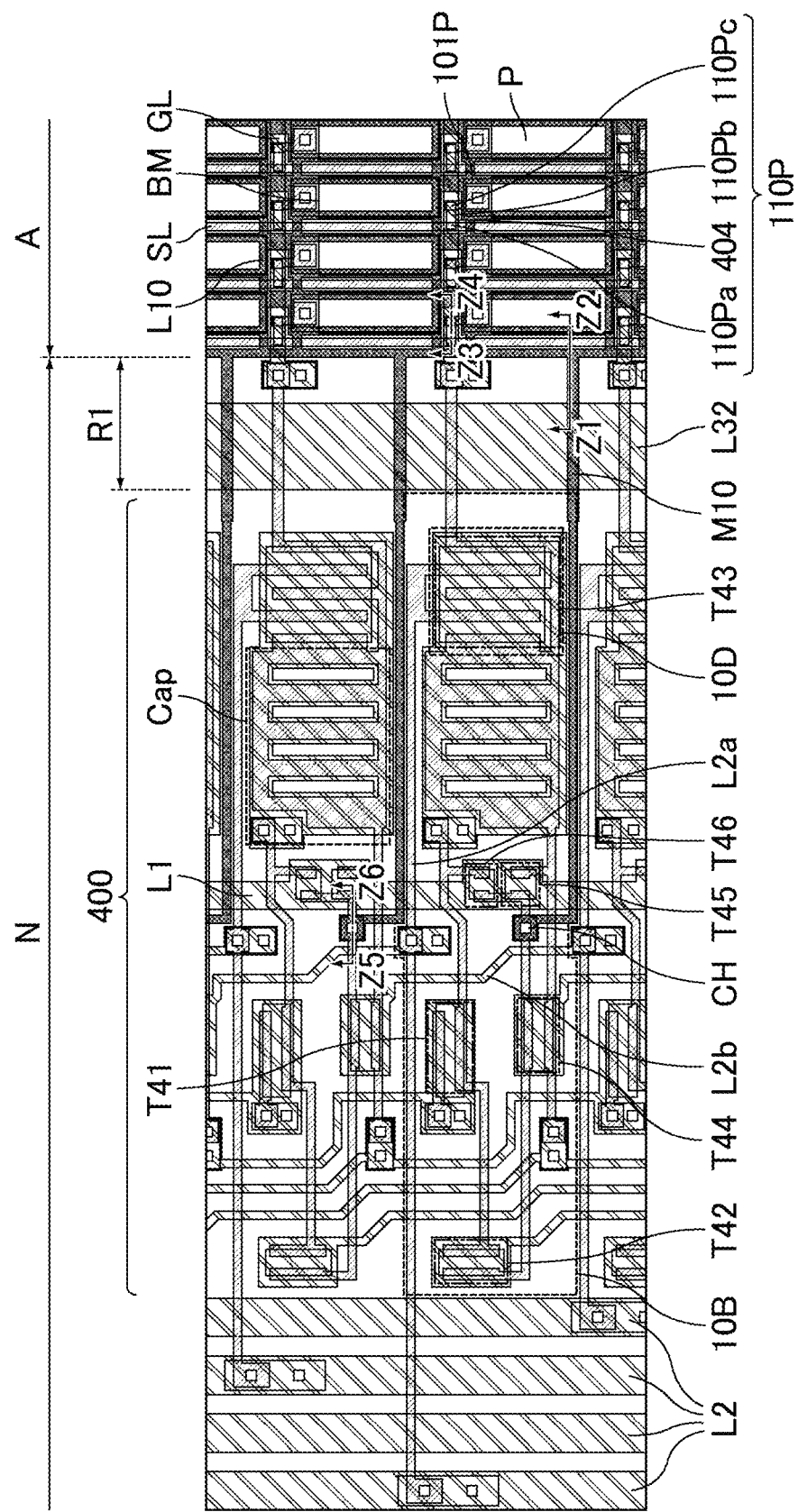
FIG. 7 is a schematic plan view showing a periphery of a unit circuit provided in a gate driver of the liquid crystal display device of Embodiment 1.

FIG. 6 is a schematic plan view of the liquid crystal display device of Embodiment 1. FIG. 7 is a schematic plan view showing a periphery of the unit circuit provided in the gate driver of the liquid crystal display device of Embodiment 1. FIG. 7 is a view focusing on the gate driver 40 located on the left side of the drawing of FIG. 6, and the gate driver 40 located on the right side of the drawing of FIG. 6 has a configuration in which the gate driver 40 located on the left side is right and left reversed.

As shown in FIG. 6, in the frame region N of the array substrate 4 of the liquid crystal display panel 1P, a flexible printed circuit board (FPC) 2 connected to the liquid crystal display panel 1P is arranged, and the IC chip 3 having the display control circuit 20, the source driver (video signal line drive circuit) 30, and the common driver (common electrode drive circuit) 32 is mounted. In addition, in the frame region N of the array substrate 4 of the liquid crystal display panel 1P, a common transition portion 321 for applying the common electrode drive signal CS sent to the common main line L32 to the common electrode provided on the color filter substrate is arranged.

As shown in FIGS. 6 and 7, in the display region A of the array substrate 4 provided in the liquid crystal display device 1, multiple scanning signal lines GL are arranged at an interval of, for example, approximately 60 μm, and multiple video signal lines SL are arranged at an interval of, for example, approximately 20 μm, and the liquid crystal display device 1 has a corresponding GDM configuration of vertical stripe pixels. For example, a 5.2-type FHD TN-mode liquid crystal display device may be mentioned as an example of the liquid crystal display device 1 of the present embodiment.

In the frame region N of the array substrate 4 included in the liquid crystal display device 1, a shift register 400 in which multiple unit circuits 10B each including an output control TFT 10D and a bootstrap capacitor Cap serving as a capacitor are connected in multiple stages, and a main line for inputting a drive signal to the shift register 400 are arranged. In the liquid crystal display device 1, one initialization line L1 and four clock signal lines L2 are arranged as the main line for inputting a drive signal to the shift register 400. First to fourth gate clock signals CLK1 to CLK4 are separately input to the four clock signal lines L2, respectively. Further, in the frame region N of the array substrate 4, the common main line L32 is arranged between the shift register 400 and the display region A.

The liquid crystal display device 1 includes a color filter substrate 5 as a counter substrate facing the array substrate 4. A black matrix BM covering the scanning signal line GL, the video signal line SL, the pixel control TFT 110P and the like is provided on the color filter substrate 5, and the black matrix BM has a rectangular opening provided for each display unit P. The black matrix BM is also provided in the frame region N and shields the frame region N from light.

Figure 8:
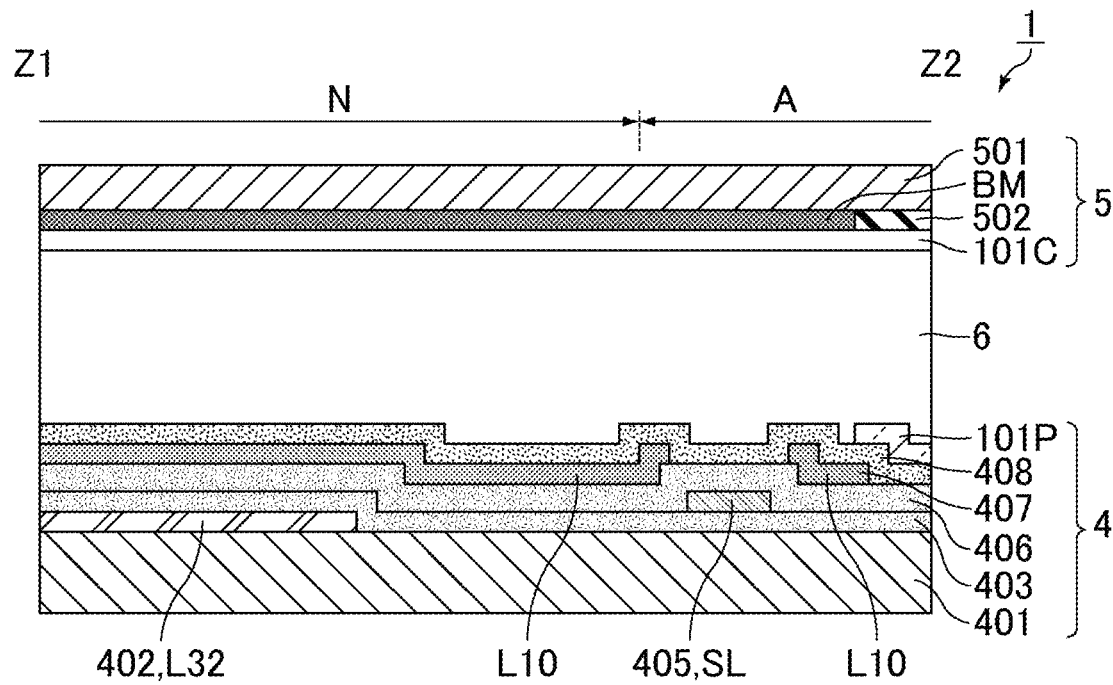
FIG. 8 is a schematic cross-sectional view from the display region to the frame region of the liquid crystal display device of Embodiment 1.
Figure 9:
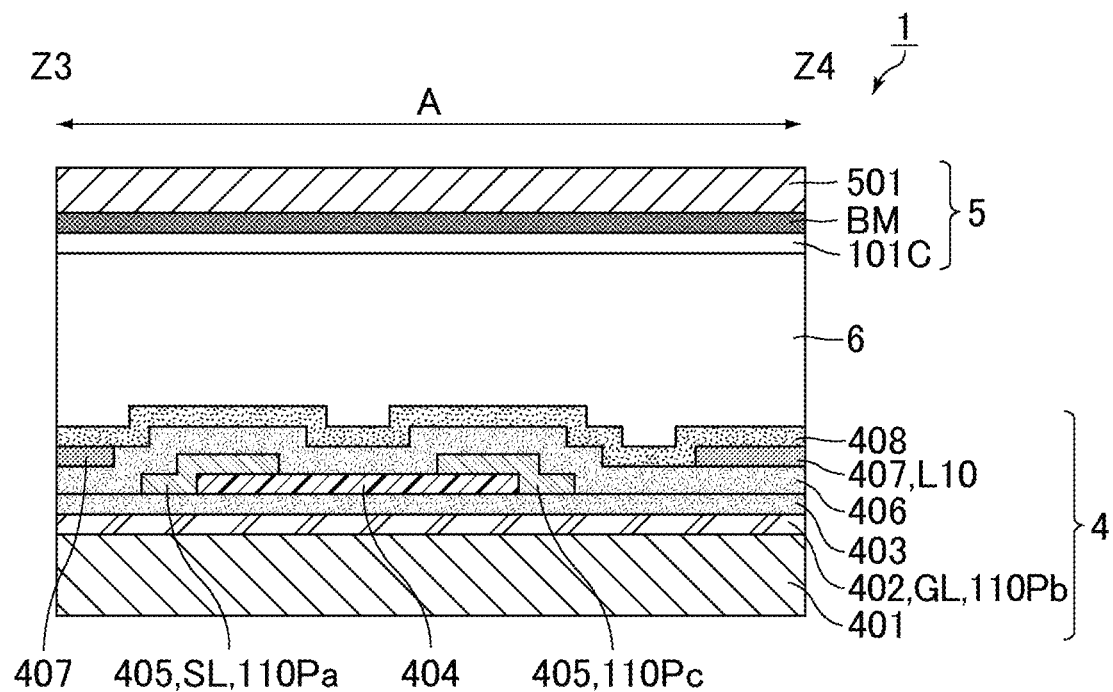
FIG. 9 is a schematic cross-sectional view showing a periphery of a pixel control TFT provided in the liquid crystal display device of Embodiment 1.

Here, the layer configuration of the liquid crystal display device 1 will be described. FIG. 8 is a schematic cross-sectional view from the display region to the frame region of the liquid crystal display device of Embodiment 1. FIG. 9 is a schematic cross-sectional view showing a periphery of the pixel control TFT provided in the liquid crystal display device of Embodiment 1. FIG. 8 is a schematic cross-sectional view taken along line Z1-Z2 in FIG. 7, and FIG. 9 is a schematic cross-sectional view taken along line Z3-Z4 in FIG. 7.

As shown in FIGS. 8 and 9, the liquid crystal display device 1 includes an array substrate 4, a color filter substrate 5, and a liquid crystal layer 6 sandwiched between the array substrate 4 and the color filter substrate 5. The liquid crystal display device 1 includes a first alignment film (not shown) and a second alignment film (not shown) between the array substrate 4 and the liquid crystal layer 6 and between the color filter substrate 5 and the liquid crystal layer 6, respectively. The liquid crystal display device 1 includes a first polarizing plate (not shown) and a second polarizing plate (not shown) on the surface of the array substrate 4 opposite to the liquid crystal layer 6 and on the surface of the color filter substrate 5 opposite to the liquid crystal layer 6, respectively, and includes a backlight (not shown) on the surface of the first polarizing plate opposite to the liquid crystal layer 6. The first polarizing plate and the second polarizing plate have an arrangement relationship of crossed Nicols in which the polarization axes are orthogonal to each other.

The array substrate 4 includes an insulating substrate 401, a first metal layer 402, a first insulating layer 403, a thin film semiconductor layer 404, a second metal layer 405, a second insulating layer 406, a third metal layer 407, a third insulating layer 408, and a pixel electrode 101P in order. The first insulating layer 403 is also referred to as a gate insulating film.

The color filter substrate 5 provided in the liquid crystal display device 1 includes an insulating substrate 501, a color filter 502, a black matrix BM, and a common electrode 101C in order. The color filter substrate 5 may be a color filter substrate generally used in the field of liquid crystal display devices.

The first insulating layer 403, the second insulating layer 406, and the third insulating layer 408 are, for example, inorganic insulating films. Examples of the material of the inorganic insulating film include silicon nitride ($SiN_x$) and silicon oxide ($SiO_2$). In the present embodiment, an inorganic insulating film in which a film containing $SiO_2$ on the liquid crystal layer 6 side and a film containing $SiN_x$ on the insulating substrate 401 side are stacked can be used as the first insulating layer 403. Further, in the present embodiment, an inorganic insulating film in which a film containing $SiN_x$ on the liquid crystal layer 6 side and a film containing $SiO_2$ on the insulating substrate 401 side are stacked can be used as the second insulating layer 406, and an inorganic insulating film containing $SiN_x$ can be used as the third insulating layer 408.

The first metal layer 402, the second metal layer 405, and the third metal layer 407 can be obtained by depositing, for example, a metal such as copper, titanium, aluminum, molybdenum, tungsten, or an alloy thereof in a single layer or multiple layers by a sputtering method or the like. The various conductive lines and electrodes formed on these layers can be obtained by performing patterning by a photolithography method or the like after film deposition. In the present embodiment, as the first metal layer 402 and the second metal layer 405, a metal film in which a film containing copper on the liquid crystal layer 6 side and a film containing titanium on the insulating substrate 401 side are stacked can be used, and a metal film containing copper can be used as the third metal layer 407. For the thin film semiconductor layer 404, an oxide semiconductor can be used. For example, an InGaZnO oxide semiconductor is used for the thin film semiconductor layer 404.

The pixel electrode 101P and the common electrode 101C can be formed, for example, by depositing and forming a transparent conductive material such as indium tin oxide (ITO), indium zinc oxide (IZO), zinc oxide (ZnO), tin oxide (SnO), or an alloy thereof in a single layer or multiple layers by a sputtering method or the like, and then performing patterning by using a photolithography method.

The pixel electrode 101P is an electrode provided for each display unit P, charges the drive video signal S to the pixel electrode 101P by the potential control of on/off of the scanning signal line GL, and can arbitrarily control the pixel potential. Here, the liquid crystal molecules contained in the liquid crystal layer 6 are aligned so as to be parallel to the polarization axis of the first polarizing plate in the vicinity of the first alignment film (not shown) arranged between the liquid crystal layer 6 and the array substrate 4 in the state where no voltage is applied. The liquid crystal molecules are aligned so as to be parallel to the polarization axis of the second polarizing plate in the vicinity of the second alignment film (not shown) arranged between the liquid crystal layer 6 and the color filter substrate 5. As described above, since the polarization axis of the first polarizing plate and the polarization axis of the second polarizing plate are orthogonal to each other, in the liquid crystal layer 6, from the array substrate 4 side toward the color filter substrate 5 side, the liquid crystal molecules are aligned so as to be twisted by 90 degrees while rotating in one direction. The liquid crystal material used in the present embodiment is a positive type liquid crystal material, and when a voltage is applied to the liquid crystal layer 6, liquid crystal molecules are aligned perpendicular to the insulating substrates 401 and 501 provided in the array substrate 4 and the color filter substrate 5. Thus, the magnitude of the voltage applied between the pixel electrode 101P and the common electrode 101C can be controlled, the alignment of the liquid crystal molecules can be changed, and transmission and non-transmission of light can be controlled.

Figure 10:
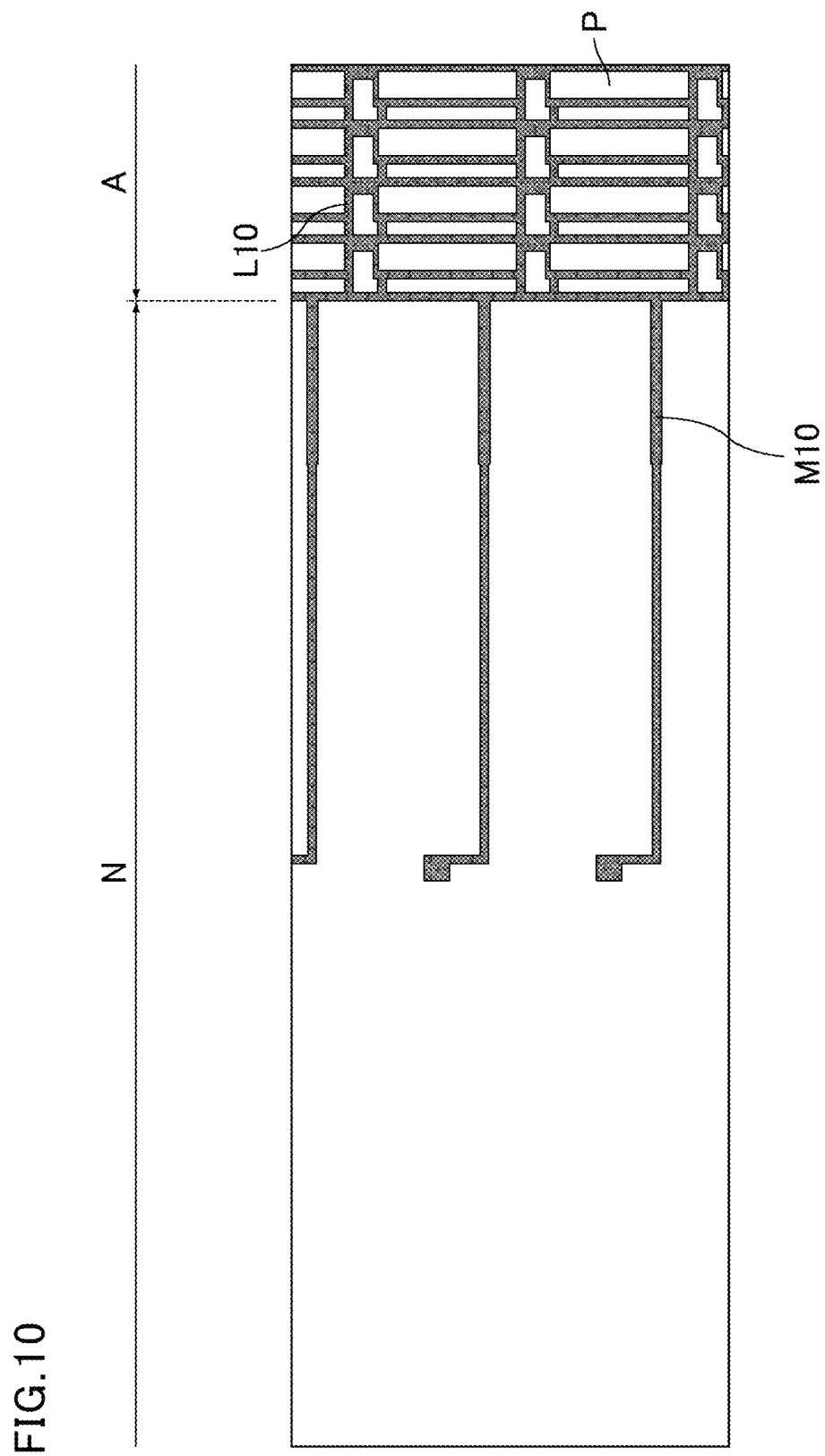
FIG. 10 is a schematic plan view of a third metal layer in the periphery of unit circuits provided in the gate driver of the liquid crystal display device of Embodiment 1.
Figure 11:
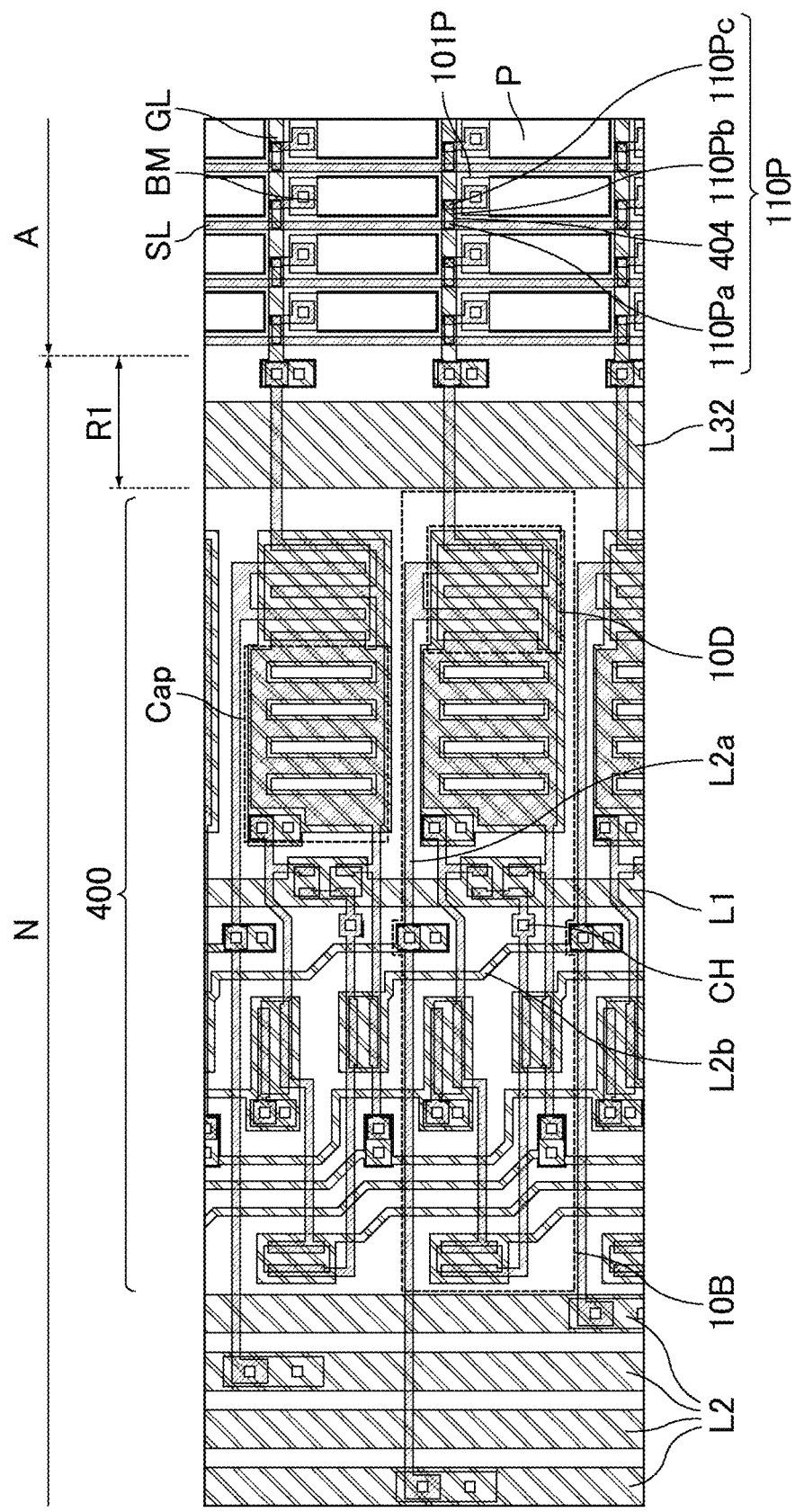
FIG. 11 is a schematic plan view of a first and a second metal layers in the periphery of the unit circuits provided in the gate driver of the liquid crystal display device of Embodiment 1.

FIG. 10 is a schematic plan view of the third metal layer in the periphery of the unit circuit provided in the gate driver of the liquid crystal display device of Embodiment 1. FIG. 11 is a schematic plan view of the first and second metal layers in the periphery of the unit circuit provided in the gate driver of the liquid crystal display device of Embodiment 1.

As shown in FIGS. 8 to 11, the array substrate 4 includes, in the display region A, the scanning signal lines GL provided in the first metal layer 402, the video signal lines SL intersecting the scanning signal lines GL and provided in the second metal layer 405, and multiple pixel control TFTs 110P. A pixel electrode 101P is arranged in each region surrounded by two video signal lines SL adjacent to each other and two scanning signal lines GL adjacent to each other. Further, on the color filter substrate 5, the common electrode 101C is arranged so as to cover the display region A.

Each pixel control TFT 110P is a three-terminal switch that is connected to a corresponding video signal line SL and scanning signal line GL among the video signal lines SL and the scanning signal lines GL, and has the thin film semiconductor layer 404, a source electrode 110Pa constituted by a part of the corresponding video signal line SL, a gate electrode 110Pb constituted by a part of the corresponding scanning signal line GL (that is, electrically connected to the scanning signal line GL), and a drain electrode 110Pc electrically connected to the corresponding pixel electrode 101P among multiple pixel electrodes 101P. The drain electrode 110Pc and the source electrode 110Pa of the pixel control TFT 110P are provided in the second metal layer 405 (also referred to as a source metal layer), and the gate electrode 110Pb of the pixel control TFT 110P is provided in the first metal layer 402 (also referred to as a gate metal layer). The pixel electrode 101P is connected to the video signal line SL via the thin film semiconductor layer 404.

The array substrate 4 includes a first line L10 provided in the display region A, and a first connection line M10 electrically connecting the first line L10 and each of the unit circuits 10B to each other. The first line L10 is provided in the third metal layer 407, and the first connection line M10 is provided extending from the first line L10 to each of the unit circuits 10B through the region R1 sandwiched by the first line L10 and the gate driver 40. In such an aspect, the drive signal for driving the gate driver 40 can be input from the first line L10 provided in the display region A to each unit circuit 10B through the region R1 sandwiched by the first line L10 and the gate driver 40. Here, a general liquid crystal display device including a GDM circuit such as the liquid crystal display device 1R of Comparative Embodiment 1 includes a main line (for example, a low potential line) which is provided extending in the direction in which multiple unit circuits 10BR are arranged in the frame region NR and to which a drive signal is input. However, in the liquid crystal display device 1 of Embodiment 1, since the drive signal can be directly input from the display region A side to each unit circuit 10B via the first line L10 and the first connection line M10, the main line to which the drive signal is input can be thinned or omitted. As a result, the frame region N can be reduced. The details of the present embodiment will be described below.

As shown in FIG. 6, a drive signal is input from the display control circuit 20 on the IC chip 3 to the first line L10, and the drive signal is directly input to each unit circuit 10B from the display region A through the region R1 sandwiched by the first line L10 and the gate driver 40 via the first connection line M10 extended to each unit circuit 10B. For example, a low potential power supply voltage VSS input from the display control circuit 20 is supplied to the first line L10 provided in the display region A via the IC chip 3 mounted in the frame region, and the power supply voltage VSS is output to the gate driver 40 from the first connection line M10 electrically connected to the first line L10. Here, in FIG. 6, the detailed illustration of the first line is omitted, and only an arrangement region is shown.

As shown in FIG. 7, the gate driver 40 has a clock signal line L2 electrically connected to the clock terminal CK, a clock signal is input to each clock terminal CK via the clock signal line L2, and the first connection line M10 does not overlap the clock signal line L2. More specifically, the first connection line M10 does not overlap the branch line extending from the clock signal line L2. Specifically, the first connection line M10 does not overlap a branch line L2a on the source electrode side of the output control TFT 10D among the branch lines extending from the clock signal line L2. The first connection line M10 does not overlap a branch line L2b on the gate electrode side of the thin-film transistor T44 among the branch lines extending from the clock signal line L2. In such an aspect, the potential of the auxiliary capacitor line (first line L10) connected to the first connection line M10 fluctuates via the capacitance of the clock signal line L2 and the first connection line M10. Further, the potential of the pixel electrode 101P fluctuates via the capacitance of the auxiliary capacitor line (first line L10) and the pixel electrode 101P, and thereby the occurrence of display defects can be suppressed.

As shown in FIG. 7 and the like, the first line L10 overlaps a part of the pixel electrode 101P provided via the third insulating layer 408 which is an upper layer of the third metal layer 407. The first line L10 forms an auxiliary capacitor between the pixel electrode 101P and the first line L10. The first line L10 also functions as an auxiliary capacitor line in each display unit P. The details will be described below.

Figure 12:
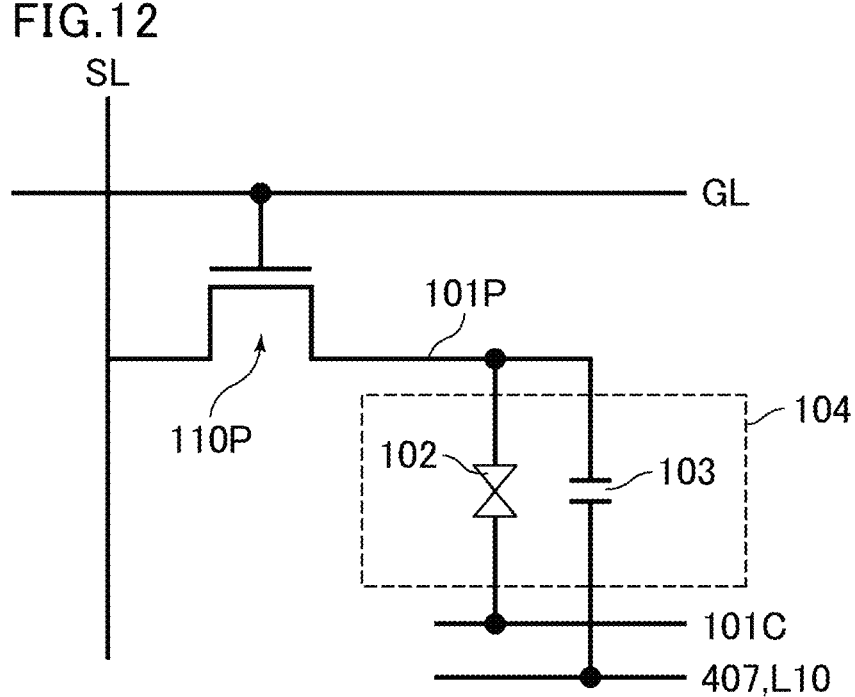
FIG. 12 is a circuit diagram showing a configuration of a display unit included in the liquid crystal display device of Embodiment 1.

FIG. 12 is a circuit diagram showing a configuration of the display unit included in the liquid crystal display device of Embodiment 1. As shown in FIG. 12, each display unit P includes a pixel control TFT 110P as a pixel control transistor in which the gate electrode is connected to the scanning signal line GL passing through a corresponding intersection and the source electrode 110Pa is connected to the video signal line SL passing through the intersection, a pixel electrode 101P connected to the drain electrode 110Pc of the pixel control TFT 110P, a common electrode 101C commonly provided to the display units P, a liquid crystal capacitor 102 formed between the pixel electrode 101P and the common electrode 101C with the liquid crystal layer 6 as a dielectric, and an auxiliary capacitor 103 formed between the pixel electrode 101P and the first line L10 provided in the third metal layer 407 with the third insulating layer 408 as a dielectric. Also, a pixel capacitor 104 is formed by the liquid crystal capacitor 102 and the auxiliary capacitor 103. Then, when the gate electrode 110Pb of each pixel control TFT 110P receives an active scanning signal GOUT from the scanning signal line GL, based on the drive video signal S that the source electrode 110Pa of the pixel control TFT 110P receives from the video signal line SL, the pixel capacitor 104 holds a voltage indicating a pixel value. In this manner, an image based on the image signal DAT input from the outside is displayed in the display region A.

The first line L10 is provided in a mesh shape so as to overlap the periphery of the pixel control TFT 110P and the edge portion (peripheral portion) of the pixel electrode 101P in the display region A. The first line L10 overlaps the scanning signal line GL and the video signal line SL in the periphery of the pixel control TFT 110P, but has a portion that does not overlap the scanning signal line GL and the video signal line SL between the pixel control TFTs 110P adjacent to each other.

The first connection line M10 is provided in the frame region N, and is extended from the first line L10 to each unit circuit 10B through the region R1 sandwiched by the first line L10 and the gate driver 40. One first connection line M10 is provided for each unit circuit 10B, and each first connection line M10 is electrically connected to the first line L10 at one end portion of the region R1 sandwiched by the first line L10 and the gate driver 40, and is extended to the corresponding unit circuit 10B passing through the other end portion of the region R1.

Figure 13:
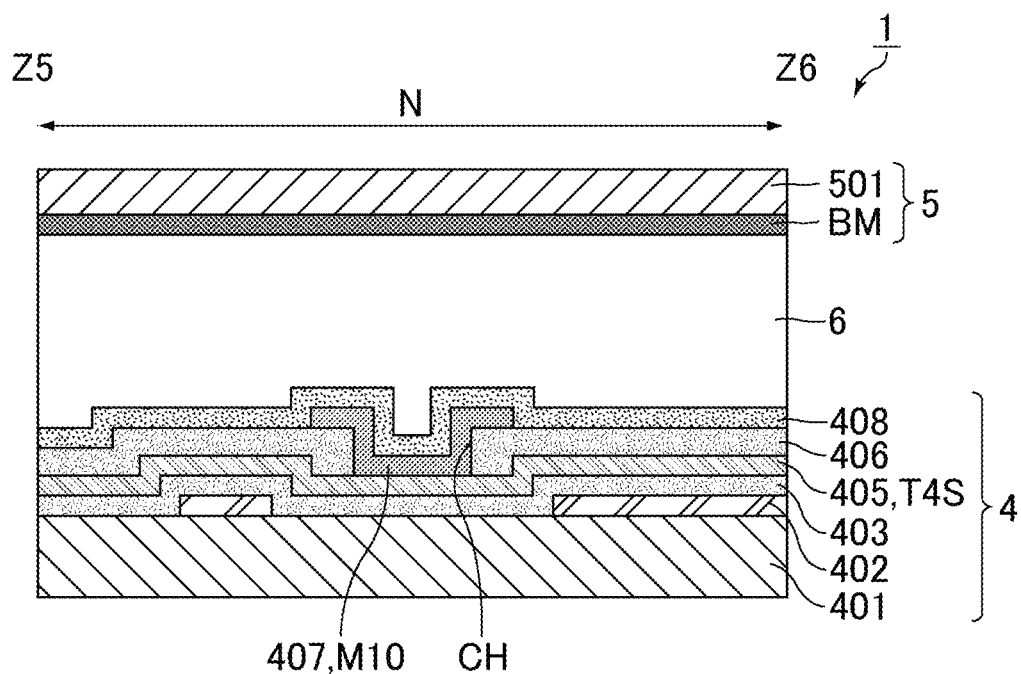
FIG. 13 is a schematic cross-sectional view of the unit circuit included in the liquid crystal display device of Embodiment 1.

FIG. 13 is a schematic cross-sectional view of a unit circuit provided in the liquid crystal display device of Embodiment 1. FIG. 13 is a schematic cross-sectional view taken along line Z5-Z6 in FIG. 7. The first connection line M10 is provided in the third metal layer 407, and the first line L10 provided in the display region A and the first connection line M10 provided in the frame region N are integrally provided in the third metal layer 407. The first connection line M10 is electrically connected to a source electrode T4S of the thin-film transistor provided in the unit circuit 10B via the contact hole CH provided in the second insulating layer 406. As described above, when the first line L10 and the first connection line M10 are integrally provided in the third metal layer 407, the provision of the contact hole for electrically connecting the first line L10 and the first connection line M10 is not necessary. Thus, the frame region N of the liquid crystal display device 1 can be further reduced.

Each unit circuit 10B has a power supply terminal VSS1 to which a low potential power supply voltage is input, and the first line L10 is electrically connected to each power supply terminal VSS1 via the first connection line M10. A low potential is input to each power supply terminal VSS1 via the first line L10 and the first connection line M10. In such an aspect, a low potential signal for driving the gate driver 40 can be supplied from the first line L10 provided in the display region A to each unit circuit 10B through the region R1 sandwiched by the first line L10 and the gate driver 40. As a result, the main line for supplying a low potential (low potential line) of a general liquid crystal display device including a GDM circuit, such as the liquid crystal display device 1R of Comparative Embodiment 1, can be omitted. Here, the low potential is a potential commonly used in the unit circuits 10BR, for example, as a low level potential (potential for turning off the pixel control TFT) supplied to the scanning signal line GL, or a reference potential of the gate electrode of the output control TFT 10DR for outputting a signal to the scanning signal line GL.

As shown in FIG. 6, the array substrate 4 includes the second line L20 (L20(1)) provided in the display region A, and the second connection line M20 (M20(1)) electrically connecting the unit circuit 10B(1) of the first stage among the unit circuits 10B and the second line L20 (L20(1)) to each other. The second line L20 (L20(1)) is provided in the third metal layer 407. The second connection line M20 (M20(1)) is provided extending from the second line L20 (L20(1)) to the unit circuit 10B(1) of the first stage without passing through the region R1 sandwiched by the second line L20 (L20(1)) and the gate driver 40. The unit circuit 10B(1) of the first stage has an input terminal to which a start signal (first gate start pulse signal) is input, and the start signal is input to the second line L20 (L20(1)) via the second connection line M20 (M20(1)). In such an aspect, the start signal for driving the gate driver 40 can be supplied from the second line L20 provided in the display region A to each unit circuit 10B without passing through the region R1 sandwiched by the second line L20 and the gate driver 40. As a result, the main line to which the start signal is input (start signal line) of a general liquid crystal display device including a GDM circuit, such as the liquid crystal display device 1R of Comparative Embodiment 1, can be omitted. Here, the start signal is a signal input to the first stage (in the present embodiment, unit circuits of the first and second stages) of the unit circuits connected in multiple stages, and the potential of the start signal rises to a high level immediately before the start of one frame and drops to a low level otherwise. In FIG. 6, the detailed illustration of the second line L20 is omitted, and only the arrangement region is shown. In the present embodiment, one frame is started at the time point t1.

Although two start signal lines L4R are arranged in the liquid crystal display device 1R of Comparative Embodiment 1, in the present embodiment, the function of one of the start signal lines can be given to the second line L20(1) and the second connection line M20(1). Further, by provision of the second line L20(2) and the second connection line M20(2) in the same manner as in the second line L20(1) and the second connection line M20(1), the function of the other start signal line can be given to the second line L20(2) and the second connection line M20(2).

That is, the array substrate 4 includes the second line L20 (L20(2)) provided in the display region A, and the second connection line M20 (M20(2)) electrically connecting the unit circuit 10B(2) of the second stage among the unit circuits 10B and the second line L20 (L20(2)) to each other. The second line L20 (L20(2)) is provided in the third metal layer 407. The second connection line M20 (M20(2)) is provided extending from the second line L20 (L20(2)) to the unit circuit 10B(2) of the second stage without passing through the region R1 sandwiched by the second line L20 (L20(2)) and the gate driver 40. The unit circuit 10B(2) of the second stage has an input terminal to which a start signal (second gate start pulse signal) is input, and the start signal is input to the second line L20 (L20(2)) via the second connection line M20 (M20(2)).

The second line L20 is not electrically connected to the first line L10. The second line L20 is formed in the display region A in the same planar shape as the first line L10. That is, in the display region A, the second line L20 is provided in a mesh shape so as to overlap the periphery of the pixel control TFT 110P and the edge portion of the pixel electrode 101P. The second line L20 overlaps the scanning signal line GL and the video signal line SL in the periphery of the pixel control TFT 110P, but has a portion that does not overlap the scanning signal line GL and the video signal line SL between the pixel control TFTs 110P adjacent to each other. The second line L20 is provided in a region different from the first line L10. The first line L10 and the second line L20 are respectively arranged in a region extending like a belt in the same direction as the direction in which they are arranged along the gate driver 40 from the unit circuits 10B(1) to 10B(n). The first line L10 and the second line L20 are arranged in this order from the gate driver 40 side, and are provided without overlapping with each other. Further, multiple second lines L20 are also arranged without overlapping with each other.

The second line L20 does not overlap the pixel control TFT 110P. This is because while a constant low potential (generally, the off potential of the pixel control TFT) is input to the low potential line, a constant low potential is input to the start signal line in most of the periods, and at least immediately before the signal is output from the unit circuit 10B(1) of the first stage, a signal for turning on the pixel control TFT 110P is supplied. When the third metal layer to which the start signal is supplied is arranged on the back gate side of the pixel control TFT 110P, the leakage current of the pixel control TFT 110P is likely to flow immediately before the signal is output from the unit circuit 10B(1) of the first stage and display may be defective.

The second connection line M20 is provided in the frame region N, and is extended from the second line L20 to each unit circuit 10B without passing through the region R1 sandwiched by the second line L20 and the gate driver 40. The second connection line M20 is provided extending from the second line L20 to each unit circuit 10B through the frame region N other than the region R1 sandwiched by the second line L20 and the gate driver 40, for example, through the frame region N on a side opposite to the side on which the display control circuit 20 is provided via the display region A.

The second connection line M20 is provided in the third metal layer 407, and the second line L20 provided in the display region A and the second connection line M20 provided in the frame region N are integrally provided in the third metal layer 407. As described above, when the second line L20 and the second connection line M20 are integrally provided in the third metal layer 407, the provision of the contact hole for electrically connecting the second line L20 and the second connection line M20 is not necessary. Thus, the frame region N of the liquid crystal display device 1 can be further reduced.

Figure 14:
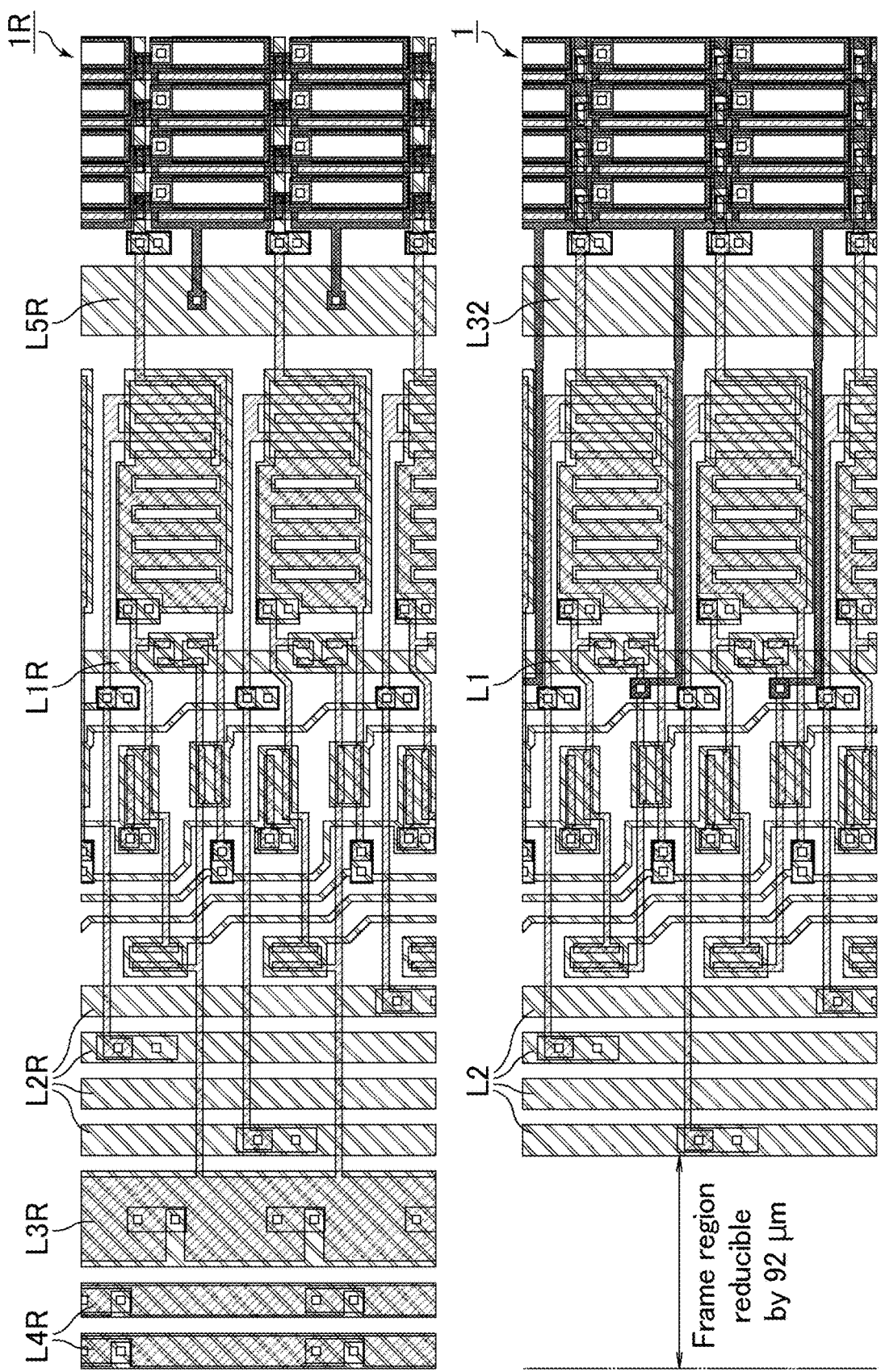
FIG. 14 is a schematic plan view comparing frame regions of the liquid crystal display device of Embodiment 1 and the liquid crystal display device of Comparative Embodiment 1.

FIG. 14 is a schematic plan view comparing frame regions of the liquid crystal display device of Embodiment 1 and the liquid crystal display device of Comparative Embodiment 1. In the present embodiment, by use of the first line L10 and the first connection line M10, the low potential line (low potential line L3R in Comparative Embodiment 1) can be omitted in the frame region N, and by use of the second line L20 and the second connection line M20, the start signal line (the start signal line L4R in Comparative Embodiment 1) can be omitted in the frame region N. As a result, for example, as shown in FIG. 14, the frame region can be reduced by 92 μm as compared with the liquid crystal display device of Comparative Embodiment 1.

The liquid crystal display device 1 of the present embodiment includes a first alignment film (not shown) and a second alignment film (not shown) between the array substrate 4 and the liquid crystal layer 6 and between the color filter substrate 5 and the liquid crystal layer 6, respectively, includes the first polarizing plate (not shown) and the second polarizing plate (not shown) on the surface of the array substrate 4 opposite to the liquid crystal layer 6 and on the surface of the color filter substrate 5 opposite to the liquid crystal layer 6, respectively, and includes the back light (not shown) on the surface of the first polarizing plate opposite to the liquid crystal layer 6. The first polarizing plate and the second polarizing plate have an arrangement relationship of crossed Nicols in which the polarization axes are orthogonal to each other.

Figure 15:
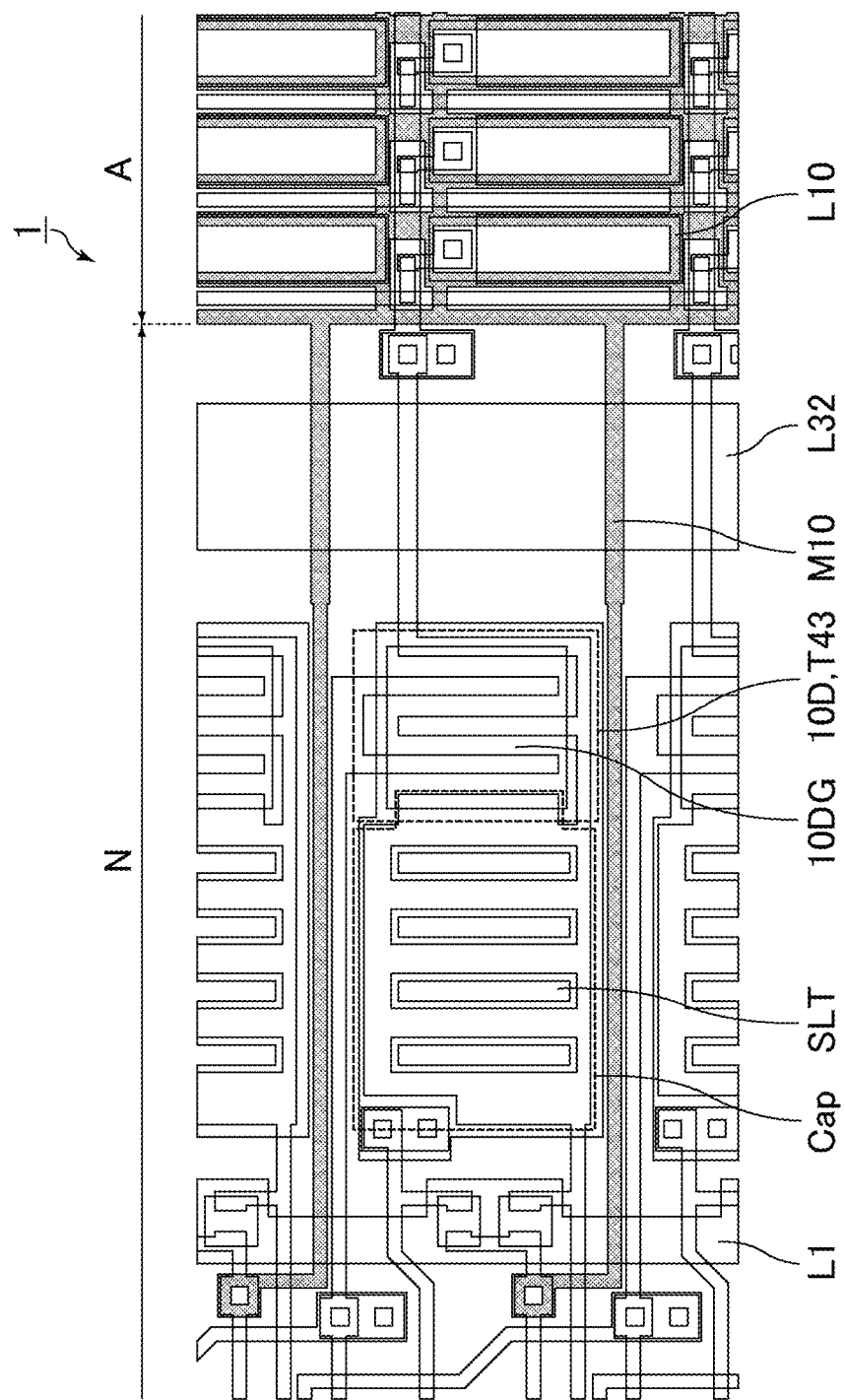
FIG. 15 is an enlarged schematic plan view showing the periphery of the unit circuit, in which a third metal layer included in the liquid crystal display device of Embodiment 1 is emphasized.

FIG. 15 is an enlarged schematic plan view showing a periphery of a unit circuit, in which a third metal layer included in the liquid crystal display device of Embodiment 1 is emphasized. As shown in FIG. 15, each unit circuit 10B has a bootstrap capacitor Cap having a first terminal Cap1 connected to the gate electrode 10DG of the output control TFT 10D (thin-film transistor T43) and a second terminal Cap2 connected to the output terminal GOUT1. At least one (preferably all) of the bootstrap capacitors Cap is a bootstrap capacitor Cap provided with slits SLT, and the first connection line M10 does not overlap the slits SLT. A seal for holding the liquid crystal layer 6 in the region sandwiched by the array substrate 4 and the color filter substrate 5 is provided in the frame region N, and the seal can be formed by hardening a photocurable sealing agent. The slits SLT provided in the bootstrap capacitor Cap are provided to accelerate the hardening of the photocurable sealing agent. By arranging the first connection line M10 so as not to overlap the slits SLT, a decrease in the effect of accelerating the hardening of the sealing agent can be suppressed.

Embodiment 2

In the present embodiment, characteristics peculiar to the present embodiment will mainly be described, and description of contents overlapping with the above embodiment will be omitted. The liquid crystal display device of the present embodiment further includes a third line and a third connection line in addition to the configuration of the liquid crystal display device 1 of Embodiment 1.

Figure 16:
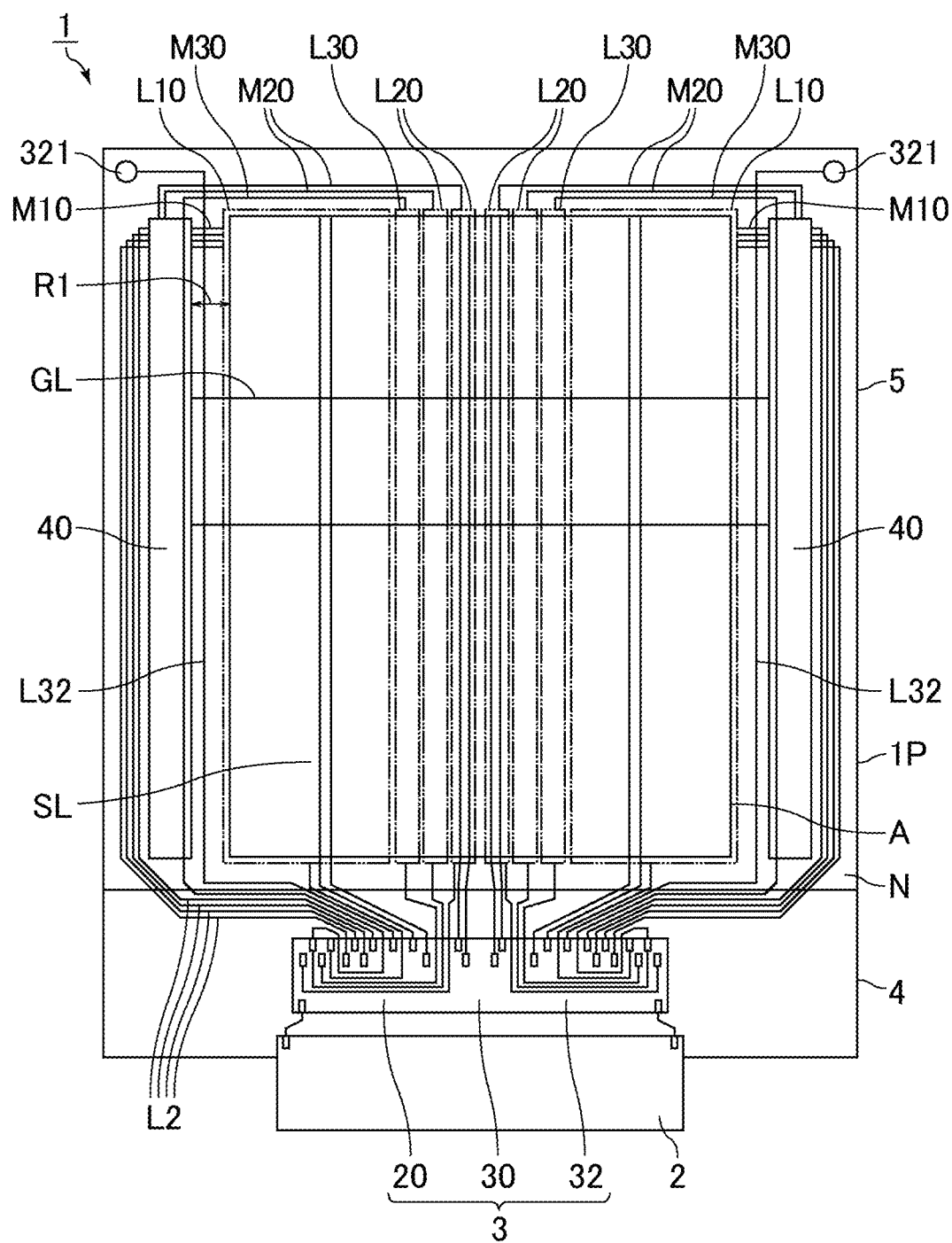
FIG. 16 is a schematic plan view of a liquid crystal display device of Embodiment 2.

FIG. 16 is a schematic plan view of a liquid crystal display device of Embodiment 2. The lines of the third metal layer (a first line, a second line, and a third line) are not shown in detail in FIG. 16 and only an arrangement region is shown.

As shown in FIG. 16, an array substrate 4 includes a third line L30 provided in the display region A, and a third connection line M30 electrically connecting the third line L30 and each unit circuit 10B to each other. The third line L30 is provided in a third metal layer 407, and the third connection line M30 is provided extending from the third line L30 to each unit circuit 10B without passing through a region R1 sandwiched by the third line L30 and the gate driver 40. Here, a general liquid crystal display device including a GDM circuit, such as the liquid crystal display device 1R of Comparative Embodiment 1 includes a main line (for example, an initialization line) which is extended in a direction where multiple unit circuits 10BR are arranged in a frame region NR and to which a drive signal is input. However, in the liquid crystal display device 1 of the present embodiment, a part of the function of the main line to which the drive signal is input can be given to the third line L30 and the third connection line M30, and thus the main line to which the drive signal is input can be thinned. In addition, the third line L30 and the third connection line M30 can be used as redundant lines of the main line to which the drive signal is input.

Each unit circuit 10B has a clear terminal CLR1 to which the initialization signal CLR is input, and the third line L30 is electrically connected to each clear terminal CLR1 via the third connection line M30, and the initialization signal CLR is input to each clear terminal CLR1 via the third line L30 and the third connection line M30. In such an aspect, the main line (initialization line) that is extended in the direction in which the unit circuits 10BR are arranged in the frame region NR and is provided to input the initialization signal CLR can be thinned. In addition, the third line L30 and the third connection line M30 can be used as redundant lines of the initialization line. Here, the initialization signal is a signal applied to the gate electrode of the thin-film transistor T46 connected to the gate electrode 10DG of the output control TFT 10D and to the gate electrode of the thin-film transistor T45 connected to the output terminal GOUT1. The signal turns on the thin-film transistor T46 and the thin-film transistor T45 to set the gate electrode 10DG (netA) of the output control TFT 10D and the output terminal GOUT1 to a low potential state (initialization). The initialization signal is input in a cycle of, for example, one frame, immediately before the start signal is input again to the unit circuit 10B of the first stage after the outputs of the unit circuits 10B from the first stage to the final stage are completed. Then, the initialization signal turns on the gate electrode of the thin-film transistor T46 and the gate electrode of the thin-film transistor T45.

The third connection line M30 is provided in the third metal layer 407, and the third line L30 provided in the display region A and the third connection line M30 provided in the frame region N are integrally provided in the third metal layer 407. As described above, when the third line L30 and the third connection line M30 are integrally provided in the third metal layer 407, the provision of the contact hole for electrically connecting the third line L30 and the third connection line M30 is not necessary. Thus, the liquid crystal display device 1 can be manufactured more easily.

The initialization line is a signal line used to initialize (reset) the potential of a specific TFT electrode (for example, the gate electrode 10DG of the output control TFT 10D) of the GDM circuit to a specific value in a certain cycle. In the same manner as the start signal line, although the initialization line is at a constant low potential for most of the period, a signal for turning on the pixel control TFT in a specific period is supplied as a signal. On the other hand, unlike the start signal line used only for the first stage of the shift register and the like, the initialization line is shared by each shift register stage, and therefore a large number of branch lines are required. This point is similar to the low potential line. Therefore, if two sets of the first line L10 and the first connection line M10 are provided in order to omit both the low potential line and the initialization line from the frame region, reconnection of the line layers is required in the display region for one of the sets (one of the sets cannot be integrally formed). Therefore, based on the configuration in which the first line L10 and the first connection line M10 are applied to the low potential line, when the third line L30 provided in the third metal layer 407 is also used as the initialization line, the initialization line provided in the conventional liquid crystal display device remains to be arranged and cannot be completely deleted. Therefore, thinning and redundancy of the initialization line are effects of the third line L30 and the third connection line M30.

The third line L30 is not electrically connected to the first line L10 and the second line L20. The third line L30 is formed in the display region A in the same planar shape as the first line L10. That is, in the display region A, the third line L30 is provided in a mesh shape so as to overlap the periphery of the pixel control TFT 110P and the edge portion of the pixel electrode 101P. The third line L30 overlaps the scanning signal line GL and the video signal line SL in the periphery of the pixel control TFT 110P, but has a portion that does not overlap the scanning signal line GL and the video signal line SL between the pixel control TFTs 110P adjacent to each other. The third line L30 is provided in a region different from the first line L10 and the second line L20. The first line L10, the second line L20, and the third line L30 are respectively arranged in a region extending like a belt in the same direction as the direction in which they are arranged from the unit circuits 10B(1) to 10B(n) along the gate driver 40. The first line L10, the third line L30, and the second line L20 are arranged in this order from the gate driver 40 side and provided without overlapping with each other.

The third connection line M30 is provided in the frame region N, and extended from the third line L30 to each unit circuit 10B without passing through the region R1 sandwiched by the third line L30 and the gate driver 40. The third connection line M30 is provided extending from the third line L30 to each unit circuit 10B through the frame region N other than the region R1 sandwiched by the third line L30 and the gate driver 40, for example, through the frame region N on a side opposite to the side on which the display control circuit 20 is provided via the display region A.

Embodiment 3

In the present embodiment, characteristics peculiar to the present embodiment will mainly be described, and description of contents overlapping with the above embodiment will be omitted. In the liquid crystal display device 1 of Embodiment 1, the first line L10 and the first connection line M10 are used as the low potential line, but in the present embodiment, the first line L10 and the first connection line M10 are used as the initialization line, and a fourth line to which a common signal is input is provided.

Figure 17:
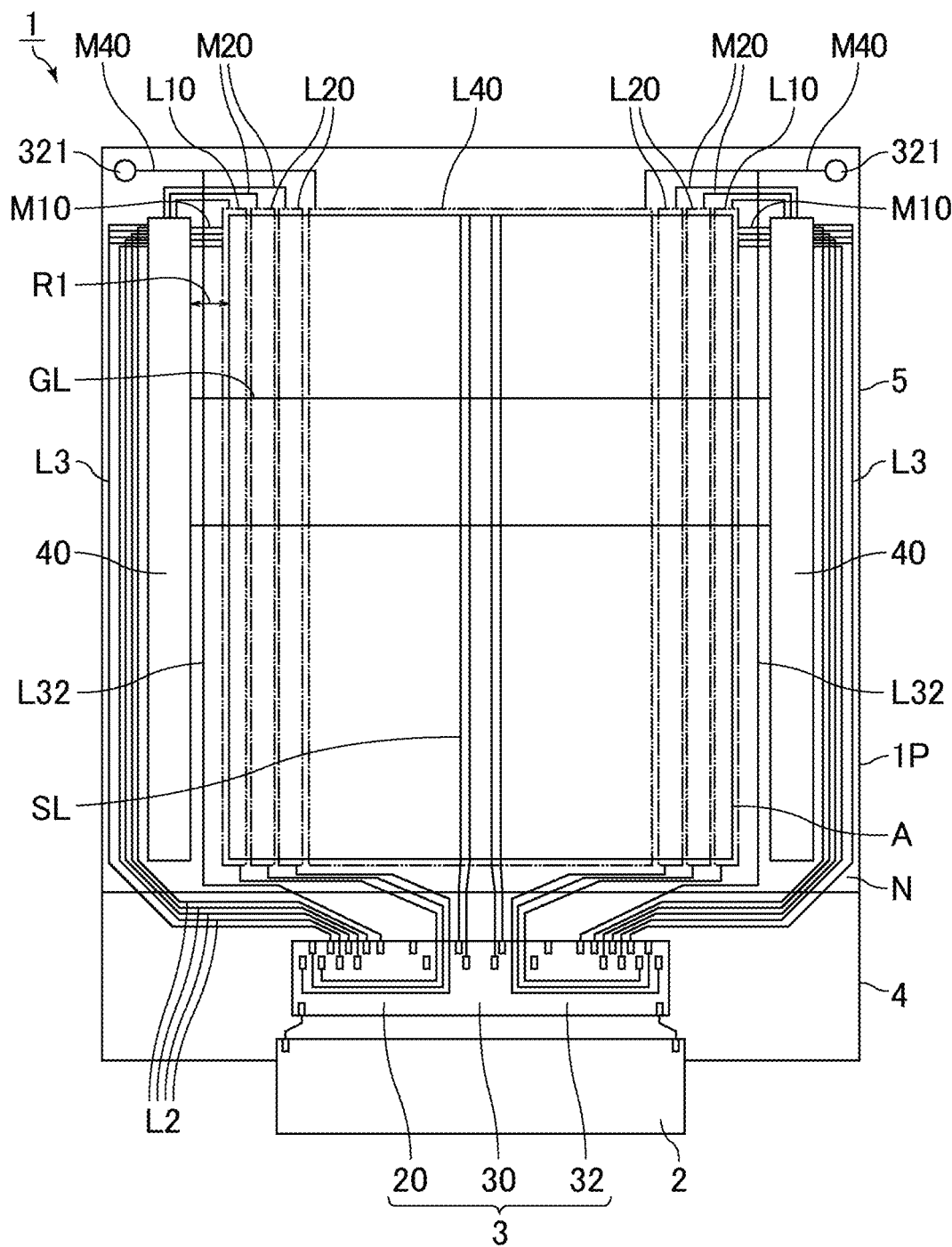
FIG. 17 is a schematic plan view of a liquid crystal display device of Embodiment 3.
Figure 18:
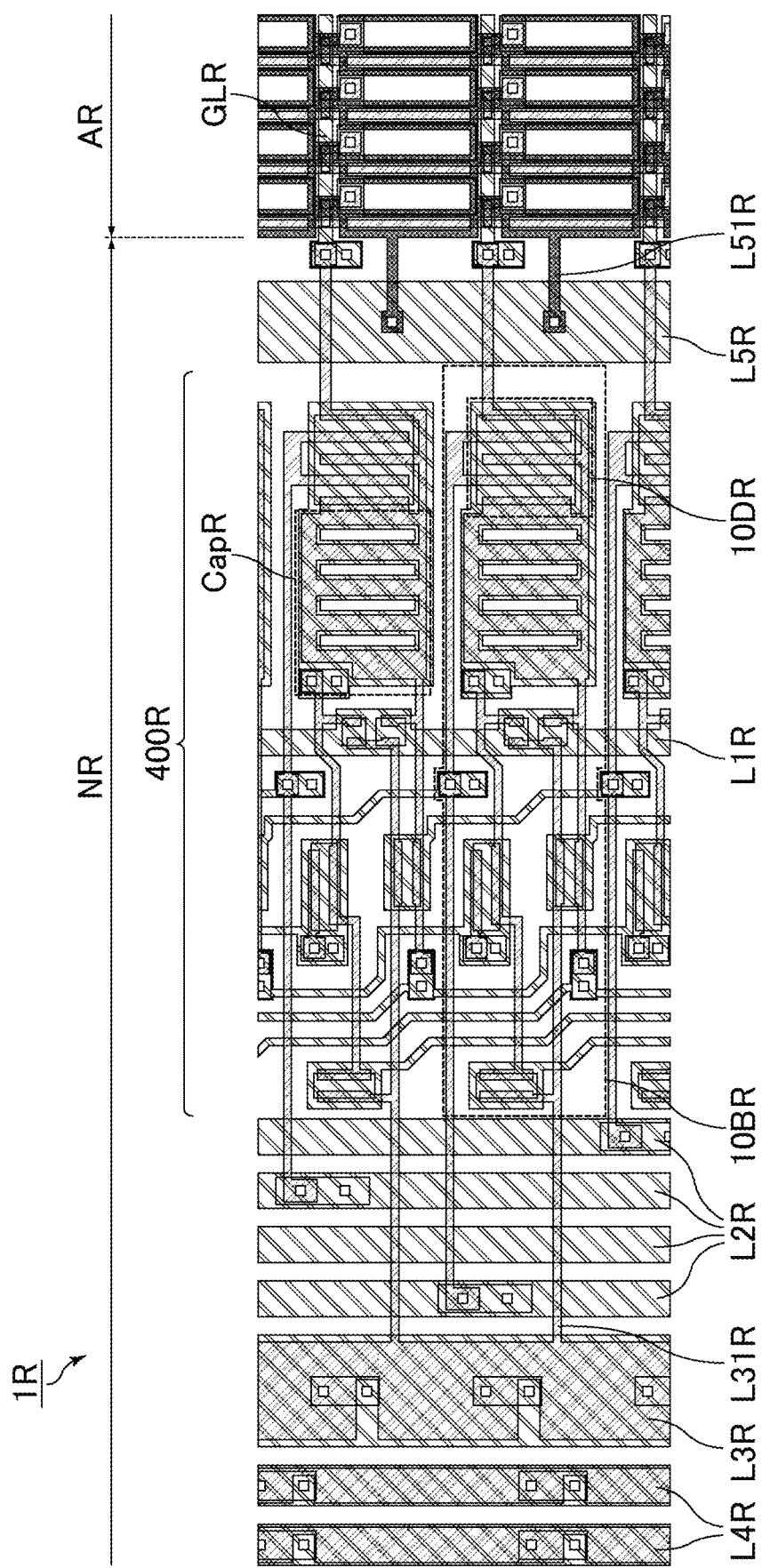
FIG. 18 is a schematic plan view showing a periphery of a unit circuit provided in a gate driver of a liquid crystal display device of Comparative Embodiment 1.

FIG. 17 is a schematic plan view of a liquid crystal display device of Embodiment 3. The lines of the third metal layer (a first line, a second line, and a fourth line) described later are not shown in detail in FIG. 17 and only an arrangement region is shown.

As shown in FIG. 17, in the liquid crystal display device 1 of the present embodiment, a first line and a first connection line M10 that function as an initialization line, and a second line L20 and a second connection line M20 that function as a start signal line, are arranged. Further, the liquid crystal display device 1 has a low potential line L3 which is extended in the direction in which multiple unit circuits 10B are arranged in the frame region N and to which a low potential signal is input, and a common main line L32 which is extended in the direction in which multiple unit circuits 10B are arranged in the frame region N and to which a common electrode drive signal CS is input.

The liquid crystal display device 1 further includes a common transition portion 321 which electrically connects an array substrate 4 and a color filter substrate 5 to each other, and the array substrate 4 has a fourth line L40 provided in the display region. The fourth line L40 is provided in a third metal layer 407 and is electrically connected to a common electrode 101C provided in the color filter substrate 5 via the common transition portion 321. The common electrode drive signal CS is input to the common electrode 101C via the fourth line L40 and the common transition portion 321. In the present embodiment, the common main line L32 provided in the frame region N and the fourth line L40 are electrically connected via a fourth connection line M40, and the common electrode drive signal CS can be also input from the fourth line L40 side. Therefore, thinning of the common main line L32 is possible.

The fourth line L40 is not electrically connected to the first line L10, the second line L20, and the third line L30.

The fourth line L40 is formed in the display region A in the same planar shape as the first line L10. That is, in the display region A, the third line L30 is provided in a mesh shape so as to overlap the periphery of the pixel control TFT 110P and the edge portion of the pixel electrode 101P. The fourth line L40 overlaps the scanning signal line GL and the video signal line SL in the periphery of the pixel control TFT 110P, but has a portion that does not overlap the scanning signal line GL and the video signal line SL between the pixel control TFTs 110P adjacent to each other. The fourth line L40 is provided in a region different from the first line L10 and the second line L20. The first line L10, the second line L20, and the fourth line L40 are respectively arranged in a region extending like a belt in the same direction as the direction in which they are arranged from the unit circuits 10B(1) to 10B(n) along the gate driver 40. The first line L10, the second line L20, and the fourth line L40 are arranged in this order from the gate driver 40 side and provided without overlapping with each other.

(Modification 1)

Although the first line L10 and the first connection line M10 of Embodiment 1 function as a low potential line, the first line L10 and the first connection line M10 are made to function as an initialization line to which an initialization signal CLR is input, and the low potential line can also be arranged in the same manner as the main line provided in the frame region of the conventional liquid crystal display device. In this case, each unit circuit has a clear terminal (CLR1) to which the initialization signal CLR is input, and the first line L10 is electrically connected to each clear terminal CLR1 via the first connection line M10. The initialization signal CLR is input to each clear terminal CLR1 via the first line L10 and the first connection line M10. In such an aspect, the first line L10 and the first connection line M10 can be made to function as an initialization line.

(Modification 2)

In Embodiment 1, although the low potential line (main line) which the conventional liquid crystal display device includes in the frame region is not arranged, the low potential line included in the conventional liquid crystal display device may be arranged in the frame region and electrically connected to the first connection line. In this case, the conventional low potential line can be thinned, and the first line and the first connection line can be used as a redundant line of the conventional low potential line.

(Modification 3)

Although the first line L10 and the first connection line M10 of Embodiment 2 function as a low potential line, and the third line L30 and the third connection line M30 function as an initialization line, the first line L10 and the first connection line M10 can be made to function as an initialization line, and the third line L30 and the third connection line M30 can be also made to function as a low potential line. In this case, the first line L10 is electrically connected to the clear terminal CLR1 via the first connection line M10, and the initialization signal CLR is input to each clear terminal CLR1 via the first line L10 and the first connection line M10. The third line L30 is electrically connected to each power supply terminal VSS1 via the third connection line, and a low potential is input to each power supply terminal VSS1 via the third line L30 and the third connection line M30.

(Modification 4)

In Embodiment 3, although the common main line L32 and the fourth line L40 provided in the frame region N are electrically connected, the common electrode drive signal CS can also be supplied to the common electrode 101C by using only the fourth line L40 without providing the common main line L32 in the frame region N. In such an aspect, the common main line L32 can be omitted.

(Modification 5)

In the above embodiment, although the first connection lines M10 are extended in a branch form from the display region A to the respective unit circuits, the shape of the first connection line M10 is not limited thereto. For example, the first connection line M10 may have a shape in which the main line is arranged in the region R1 sandwiched by the display region A and the gate driver 40, and the branch line is extended from the main line toward each unit circuit 10B, or a shape in which multiple branch lines extended to multiple unit circuits 10B adjacent to one another are configured to be one in the region R1 sandwiched by the display region A and the gate driver 40.

(Modification 6)

In the above embodiments, the case is described in which the lines (the first line L10, the second line L20, and the third line L30) provided in the third metal layer 407 are made to function as the low potential line, the start signal line, and the initialization line, respectively. However, the above embodiments can be also applied to the GDM line other than these, and reduction in the frame by thinning and improvement in the yield by the redundant configuration can be expected. However, for the following reasons, the above-described embodiments are preferably applied to the GDM line other than the clock signal line.

The lines such as the low potential line, the start signal line, and the initialization line are at a constant low potential during the writing period of the drive video signal. In addition, although the start signal line and the initialization line may be at a high level (potential to turn on the TFT) during the holding period of the written drive video signal, the high level is sufficiently short (on the order of $\mu$ seconds) with respect to the response of the liquid crystal molecules. Therefore, no direct impact is given on the display. On the other hand, in the clock signal line, the potential is always fluctuated, and the write voltage may be fluctuated, or the liquid crystal application voltage during the holding period may be influenced via the auxiliary capacitor of each pixel.

(Modification 7)

In the present embodiment, the liquid crystal display device 1 has been described by taking the liquid crystal display device of TN mode as an example, but the display mode of the liquid crystal display device is not particularly limited. Examples of display modes other than TN mode include display modes such as a fringe field switching (FFS) mode, which is a kind of horizontal alignment mode in which liquid crystal molecules are aligned in a substantially horizontal direction with respect to the main surface of the substrate in the voltage non-applied state, and a vertical alignment (VA) mode in which liquid crystal molecules having negative anisotropy of dielectric constant are vertically aligned with respect to a substrate surface. In the liquid crystal display device of the FFS mode, the common electrode is arranged via the insulating layer in the upper or lower layer of the pixel electrode provided on the third metal layer.

(Modification 8)

Although the liquid crystal display device using an InGaZnO oxide semiconductor for the thin film semiconductor layer 404 has been described in the above embodiment, amorphous silicon (a-Si) may be employed instead of the InGaZnO oxide semiconductor.

(Modification 9)

In the liquid crystal display device 1 of the above embodiment, the first metal layer 402, the first insulating layer 403, the second metal layer 405, the second insulating layer 406, and the third metal layer 407 are sequentially stacked from the insulating substrate 401 side of the array substrate 4, and a TFT having a reverse stagger structure is employed. However, the third metal layer 407, the second insulating layer 406, the second metal layer 405, the first insulating layer 403, and the first metal layer 402 may be sequentially stacked from the insulating substrate 401 side of the array substrate 4, and a TFT having a positive stagger structure may be employed.

(Modification 10)

Although the liquid crystal display device 1 is described as an example of the image display device in the above embodiment, the image display device is not limited thereto. Examples of image display devices other than liquid crystal display devices include image display devices such as electronic paper (microcapsule electrophoretic display panel) and organic EL (Electroluminescence) display.

What is claimed is:

1. An image display device comprising:
a substrate;
a display region for displaying an image; and
a frame region which is a region outside the display region,
wherein the substrate includes:
an insulating substrate;
a first metal layer, a first insulating layer, a second metal layer, a second insulating layer, and a third metal layer stacked in the stated order on the insulating substrate;
a pixel electrode provided in the display region;
a pixel control transistor provided in the display region and electrically connected to the pixel electrode;
a first line provided in the display region;
a gate driver provided with multiple unit circuits connected in multiple stages and provided monolithically on the insulating substrate in the frame region; and
a first connection line electrically connecting the first line and each of the unit circuits to each other,
a gate electrode of the pixel control transistor is provided in the first metal layer,
a drain electrode and a source electrode of the pixel control transistor are provided in the second metal layer,
the first line is provided in the third metal layer, and
the first connection line is extended from the first line to each of the unit circuits through a region sandwiched by the first line and the gate driver.

2. The image display device according to claim 1,
wherein the first connection line is provided in the third metal layer, and
the first line and the first connection line are integrally provided in the third metal layer.

3. The image display device according to claim 1,
wherein the substrate further includes a scanning signal line electrically connected to the gate electrode of the pixel control transistor, and
each of the unit circuits includes:
a clock terminal to which a clock signal is input;
an output terminal electrically connected to the scanning signal line and configured to output a scanning signal to the scanning signal line; and
an output control transistor with one of a source electrode and a drain electrode connected to the clock terminal and the other of the source electrode and the drain electrode connected to the output terminal.

4. The image display device according to claim 3,
wherein each of the unit circuits further includes a bootstrap capacitor having a first terminal connected to a gate electrode of the output control transistor and a second terminal connected to the output terminal,
at least one of the bootstrap capacitors is a bootstrap capacitor provided with a slit, and
the first connection line does not overlap the slit.

5. The image display device according to claim 3,
wherein the gate driver further includes a clock signal line electrically connected to each of the clock terminals,
each of the clock terminals receives a clock signal via the clock signal line, and
the first connection line does not overlap the clock signal line.

6. The image display device according to claim 1,
wherein the substrate further includes:
a second line provided in the display region; and
a second connection line electrically connecting a unit circuit of a first stage among the unit circuits and the second line to each other,
the second line is provided in the third metal layer,
the second connection line is provided extending from the second line to the unit circuit of the first stage without passing through a region sandwiched by the second line and the gate driver,
the unit circuit of the first stage includes an input terminal to which a start signal is input,
the second line is electrically connected to the input terminal via the second connection line, and
a start signal is input to the input terminal via the second line and the second connection line.

7. The image display device according to claim 6,
wherein the second line does not overlap the pixel control transistor.

8. The image display device according to claim 1,
wherein the substrate further includes:
a third line provided in the display region; and
a third connection line electrically connecting the third line and each of the unit circuits to each other,
the third line is provided in the third metal layer, and
the third connection line is provided extending from the third line to each of the unit circuits without passing through a region sandwiched by the third line and the gate driver.

9. The image display device according to claim 8,
wherein each of the unit circuits includes a clear terminal to which an initialization signal is input,
the third line is electrically connected to each of the clear terminals via the third connection line, and
the initialization signal is input to each of the clear terminals via the third line and the third connection line.

10. The image display device according to claim 1,
wherein each of the unit circuits includes a power supply terminal to which a low potential is input,
the first line is electrically connected to each of the power supply terminals via the first connection line, and
a low potential is input to each of the power supply terminals via the first line and the first connection line.

11. The image display device according to claim 1,
wherein each of the unit circuits includes a clear terminal to which an initialization signal is input,
the first line is electrically connected to each of the clear terminals via the first connection line, and the initialization signal is input to each of the clear terminals via the first line and the first connection line.

12. The image display device according to claim 1, further comprising:

a counter substrate facing the substrate and including a common electrode; and a common transition portion electrically connecting the substrate and the counter substrate to each other, wherein the substrate further includes a fourth line provided in the display region, the fourth line is provided in the third metal layer and is electrically connected to the common electrode via the common transition portion, and a common signal is input to the common electrode via the fourth line and the common transition portion.

13. The image display device according to claim 1, which is a liquid crystal display device.

\* \* \* \* \*